United States Patent
Zhang et al.

(10) Patent No.: US 10,781,678 B2
(45) Date of Patent: Sep. 22, 2020

(54) METHODS AND SYSTEMS FOR ENHANCED OIL RECOVERY EMPLOYING NANOFLUIDS

(71) Applicants: SCHLUMBERGER TECHNOLOGY CORPORATION, Sugar LanD, TX (US); ILLINOIS INSTITUTE OF TECHNOLOGY, Chicago, IL (US)

(72) Inventors: Hua Zhang, Chicago, IL (US); Terizhandur S. Ramakrishnan, Boxborough, MA (US); Alexander Nikolov, Chicago, IL (US); Darsh Wasan, Darien, IL (US)

(73) Assignees: SCHLUMBERGER TECHNOLOGY CORPORATION, Sugar Land, TX (US); ILLINOIS INSTITUTE OF TECHNOLOGY, Chicago, IL (US)

( * ) Notice: Subject to any disclaimer, the term of this patent is extended or adjusted under 35 U.S.C. 154(b) by 0 days.

(21) Appl. No.: 16/067,982

(22) PCT Filed: Jan. 4, 2017

(86) PCT No.: PCT/US2017/012080
§ 371 (c)(1),
(2) Date: Jul. 3, 2018

(87) PCT Pub. No.: WO2017/120154
PCT Pub. Date: Jul. 13, 2017

(65) Prior Publication Data
US 2019/0024487 A1    Jan. 24, 2019

Related U.S. Application Data

(60) Provisional application No. 62/274,484, filed on Jan. 4, 2016.

(51) Int. Cl.
*E21B 43/16* (2006.01)
*C09K 5/10* (2006.01)
*C09K 8/58* (2006.01)

(52) U.S. Cl.
CPC ............... *E21B 43/16* (2013.01); *C09K 8/58* (2013.01); *C09K 2208/10* (2013.01)

(58) Field of Classification Search
CPC ........ C09K 5/10; C09K 2208/10; E21B 43/16
See application file for complete search history.

(56) References Cited

U.S. PATENT DOCUMENTS

2003/0220204 A1   11/2003   Baran, Jr. et al.
2009/0211758 A1   8/2009    Bragg et al.
(Continued)

OTHER PUBLICATIONS

Alvarado, F. E. et al., "Visualization of Three Phases in Porous Media using Micro Computed Tomography", Petrophysics, 2004, 45(6), pp. 490-498.
(Continued)

*Primary Examiner* — Zakiya W Bates

(57) ABSTRACT

Methods and systems are provided for recovery of oil from a subterranean reservoir employing nanofluid injection at a controlled flow rate. The method comprises the step of injecting nanofluid through at least one well that traverses the subterranean reservoir and into the subterranean reservoir at a controlled flow rate. And, the system comprises: at least one well that traverses the subterranean reservoir; and injection means for injecting nanofluid through the well and into the subterranean reservoir at a controlled flow rate.

18 Claims, 15 Drawing Sheets

(56) References Cited

U.S. PATENT DOCUMENTS

| | | |
|---|---|---|
| 2012/0255887 A1 | 10/2012 | Halms et al. |
| 2014/0096964 A1 | 4/2014 | Chakraborty et al. |
| 2015/0175876 A1* | 6/2015 | Resasco ............... E21B 43/166 |
| | | 166/270.1 |
| 2016/0076348 A1* | 3/2016 | Fernandez-Ibanez ...................... |
| | | E21B 43/2406 |
| | | 166/302 |

OTHER PUBLICATIONS

Aoudia, M. et al., "Laboratory Study of Alkyl Ether Sulfonates for Improved Oil Recovery in High-Salinity Carbonate Reservoirs: A Case Study", Energy and Fuels, 2010, 24(6), pp. 3655-3660.

Auzerais, F. M. et al., "Transport in sandstone: A study based on three dimensional microtomography", Geophysical Research Letters, 1996, 23(7), pp. 705-708.

Ayatollah, S. et al., "Nanotechnology-Assisted Eor Techniques: New Solutions to Old Challenges", SPE-157094-MS, presented at the SPE International Oilfield Nanotechnology Conference and Exhbition, Noordwijk, The Netherlands, 2012, 15 pages.

Babadagli, T. et al., "Dynamics of Capillary Imbibition When Surfactant, Polymer, and Hot Water Are Used as Aqueous Phase for Oil Recovery", Journal of Colloid and Interface Science, 2002, 246, pp. 203-213.

Chengara, a. et al., "Spreading of nanofluids driven by the structural disjoining pressure gradient", Journal of Colloid and Interface Science, 2004, 280(1), pp. 192-201.

Dunsmuir, J. H. et al., "X-Ray Microtomography: A New Tool for the Characterization of Porous Media", SPE 22860—MS, presented at the SPE Annual Technical Conference and Exhibition, Dallas, Texas, USA, 1991, pp. 423-430.

Hendraningrat, L. et al., "A coreflood investigation of nanofluid enhanced oil recovery", Journal of Petroleum Science and Engineering, 2013, 111, pp. 128-138.

Hendraningrat, L. et al., " A Coreflood Investigation of Nanofluid Enhanced Oil Recovery in Low-Medium Permeability Berea Sandstone", SPE 164106-MS, presented the the SPE International Symposium on Oilfield Chemistry, the Woodlands, Texas, USA, 2013, 14 pages.

Hendraningrat, L. et al., "Effect of Some Parameters Influencing Enhanced Oil Recovery Process using Silica Nanoparticles: An Experimental Investigation", SPE 165955-MS, presented at the SPE Reservoir Characterization and Simulation Conference and Exhibition, Abu Dhabi, UAE, 2013, 10 pages.

Hendraningrat, L. et al., "Effects of the Initial Rock Wettability on Silica-Based Nanofluid-Enhanced Oil Recovery Processes at Reservoir Temperatures", Energy & Fuels 2014, 28(10), pp. 6228-6241.

Hendraningrat, L. et al., "Enhancing Oil Recovery of Low— Permeability Berea Sandstone through Optimized Nanofluids Concentration", SPE 1658283-MS, presented at the SPE Enhanced Oil Recovery Conference, Kuala Lumpur, Malaysia, 2013, 10 pages.

Iglauer, S. et al., " X-ray tomography measurements of power-law cluster size distributions for the nonwetting phase in sandstones", Physical Review, E 2010, 82, 056315, 3 pages.

Iglauer, S. et al., "Comparison of residual oil cluster size distribution, morphology and saturation in oil-wet and water—wet sandstone", Journal of Colloid and Interface Science, 2012, 375, pp. 187-192.

Ju, B. et al., "Enhanced Oil Recovery by Flooding with Hydrophilic Nanoparticles", China Particuology, 2006, 4(1), pp. 41-46.

Ju, B. et al., "Experimental study and mathematical model of nanoparticle transport in porous media", Powder Technology, 2009, 192, pp. 195-202.

Binshan, Ju et al., "Study of Wettability and Permeability Change Caused by Adsorption of Nanometer Structured Polysilicon on the Surface of Porous Media", SPE-77938-MS, presented at the SPE Asia Pacific Oil and Gas Conference and Exhibition, Melbourne, Australia, 2002, 12 pages.

Kao, R. L. et al., "Mechanisms of Oil Removal form a Solid Surface in the Presence of Anionic Micellar Solutions", Colloids and Surfaces, 1988, 34(4), pp. 389-398.

Karimi, a. et al., "Wettability Alteration in Carbonates using Zirconium Oxide Nanofluids: Eor Implications", Energy & Fuels, 2012, 26(2), pp. 1028-1036.

Karpyn, Z. T. et al., "Experimental investigation of trapped oil clusters in a water-wet bead pack using X-ray microtomography", Water Resources Research, 2010, 46(4), 25 pages.

Knackstedt, M. A. et al., "Improved Characterization of Eor Processes 3D. Characterizing Mineralogy, Wettability and Residual Fluid Phases at the Pore Scale", SPE-145093-MS, presented at the SPE Enhanced Oil Recovery Conference, Kuala Lumpur, Malaysia, 2011, 6 pages.

Kondiparty, K. et al., "Dynamic Spreading of Nanofluids on Solids Part I: Experimental", Langmuir, 2012, 28(41), pp. 14618-14623.

Kondiparty, K. et al., "Wetting and Spreading of Nanofluids on Solid Surfaces Driven by the Structural Disjoining Pressure: Statics Analysis and Experiments", Langmuir, 2011, 27(7), pp. 3324-3335.

Kong, X. et al., "Application of Micro and Nano Technologies in the Oil and Gas Industry-An Overview of the Recent Progress", SPE-138241-MS, presented at the Abu Dhabi International Petroleum Exhibition and Conference, 2010, 11 pages.

Kumar, M. et al., "Visualizing and Quantifying the Residual Phase Distribution in Core Material", Petrophysics, 2010, 51(5), pp. 323-332.

Landis, E. N. et al., "X-ray microtomography", Materials Characterization, 2010, 61, pp. 1305-1316.

Landry, C. J. et al. "Pore-scale analysis of trapped immiscible fluid structures and fluid interfacial areas in oil-wet and water-wet bead packs", Geofluids, 2011, 11(2), pp. 209-227.

Liu, K.-L., "Dynamic Spreading of Nanofluids on Solids Part II: Modeling", Langmuir, 2012, 28(47), pp. 16274-16284.

Moghaddam, R. N. et al., "Comparative Study of Using Nanoparticles for Enhanced Oil Recovery: Wettability Alteration of Carbonate Rocks", Energy & Fuels 2015, 29(4), pp. 2111-2119.

Nikolov, a. et al., "The dynamics of capillary-driven two-phase flow: The role of nanofluid structural forces", Journal of Colloid and Interface Science, 2015, 449, pp. 92-101.

Onyekonwu, M. O., "Investigating the Use of Nanoparticles in Enhancing Oil Recovery", SPE 140744-MS, presented at the Nigeria Annual International Conference and Exhibition, Tinapa-Calabar, Nigeria, 2010, 14 pages.

Otsu, N., "A Threshold Selection Method from Gray-Level Histograms," IEEE Transactions on Systems, Man, and Cybernetics, 1979, 9(1), pp. 62-66.

Prodanovic, M. et al., "3D image-based characterization of fluid displacement in a Berea core", Advances in Water Resources, 2007, 30, pp. 214-226.

Ramakrishnan, T. S., et al., "A new technique to measure static and dynamic properties of a partially saturated porous medium", Chemical Engineering Science, 1991, 46(4), pp. 1157-1163.

Shahrabadi, a. et al., "Experimental Investigation of HLP Nanofluid Potential to Enhance Oil Recovery: A Mechanistic Approach", SPE 156642-MS presented at the SPE International Oilfield Nanotechnology Conference and Exhibition, The Netherlands, 2012, 9 pages.

Suleimanov, B. A. et al., "Nanofluid for enhanced oil recovery", Journal of Petroleum Science and Engineering, 2011, 78(2), pp. 431-437.

Wasan, D. T. et al. " Spreading of nanofluids on solids", Nature, 2003, 423, pp. 156-159.

Wildenschild, D. et al., "X-ray imaging and analysis techniques for quantifying pore-scale structure and processes in subsurface porous medium systems", Advances in Water Resources, 2013, 51, pp. 217-246.

Wong, K. V. et al., "Applications of Nanofluids: Current and Future", Advances in Mechanical Engineering, 2010, pp. 1-11.

Wu, S. et al., "Cleansing dynamics of oily soil using nanofluids", Journal of Colloid and Interface Science, 2013, 396, pp. 293-306.

Zhang, H. et al., "Dewetting Film Dynamics Inside a Capillary Using a Micellar Nanofluid", Langmuir, 2014, 30(31), pp. 9430-9435.

(56) References Cited

OTHER PUBLICATIONS

Zhang, H. et al., "Enhanced Oil Recovery (EOR) Using Nanoparticle Dispersions: Underlying Mechanism and Imbibition Experiments", Energy & Fuels, 2014, 28(5), pp. 3002-3009.

* cited by examiner

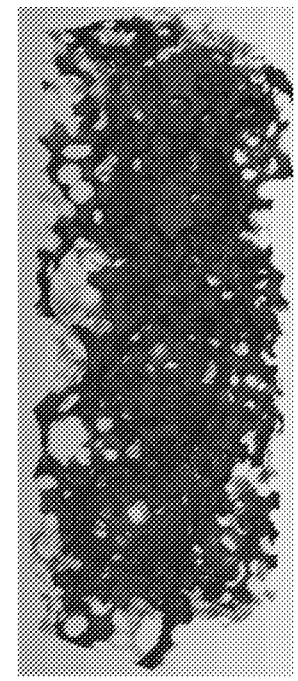
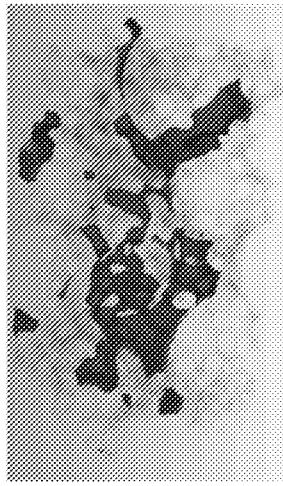
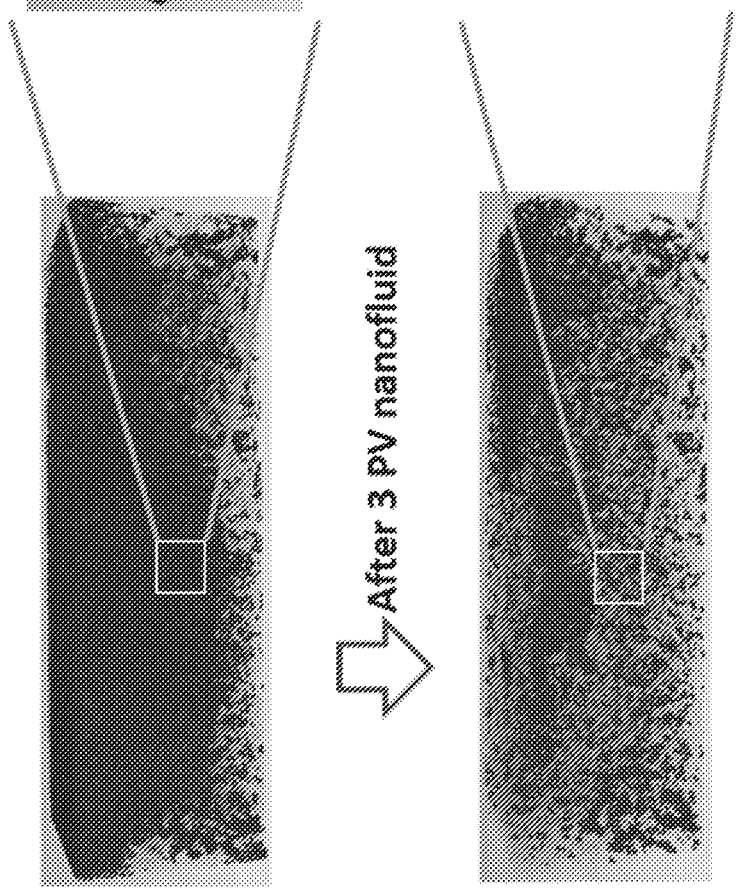
After 3 PV nanofluid
FIGURE 15A
FIGURE 15B

METHODS AND SYSTEMS FOR ENHANCED OIL RECOVERY EMPLOYING NANOFLUIDS

RELATED APPLICATIONS

The present application claims the benefit of Provisional Application Ser. No. 62/274,484, filed on Jan. 4, 2016 and entitled "METHODS AND SYSTEMS FOR ENHANCED OIL RECOVERY EMPLOYING NANOFLUIDS," which is hereby incorporated by reference in its entirety.

FIELD

This disclosure relates to methods and systems for enhanced oil recovery.

BACKGROUND

Enhanced oil recovery (EOR) aims to recover trapped oil left in reservoirs after primary and secondary recovery methods. Nanofluids (such as polymer latexes, globular proteins, and surfactant micelles) have recently become attractive agents for EOR. See (i) Kong et al., "Application of micro and nano technologies in the oil and gas industry— An overview of the recent progress," SPE 2010, http://dx.doi.org/10.2118/138241-MS; (ii) Wong et al., "Applications of nanofluids: Current and future," Adv. Mech. Eng. 2010, 1-11; and (iii) Ayatollahi et al., "Nanotechnology-assisted EOR techniques: New solutions to old challenges," SPE 2012, http://dx.doi.org/10.2118/1570 94-MS.

Researchers have observed positive results and an increase in ultimate oil recovery in laboratory experiments by injecting nanofluids.

Ju et al. conducted experimental and theoretical studies on wettability alteration and permeability change caused by adsorption of lipophobic and hydrophilic polysilicon nanoparticles (LHP) on the surface of sandstone cores. See (i) Ju et al., "Enhanced oil recovery by flooding with hydrophilic nanoparticles," China Particuol. 2006, 4, 41-46; (ii) Ju et al., "Experimental study and mathematical model of nanoparticle transport in porous media," Powder Technol. 2009, 192, 195-202; and (iii) Ju et al. "Study of wettability and permeability change caused by adsorption of nanometer structured polysilicon on the surface of porous media," SPE 2002, http://dx.doi.org/10.2118/77938-MS. From core displacement experiments, they observed LHP in the size range of 10-500 nm could improve oil recovery by about 9% compared to water. Based on their numerical simulation, an LHP concentration of 2.0-3.0% percent by volume was suggested for EOR, since at higher concentrations, porosity and permeability declined due to retention of LHP within the medium.

Babadagli et al. studied capillary imbibition using different surfactants and polymer solutions for enhancing oil recovery. See Babadagli et al., "Dynamics of capillary imbibition when surfactant, polymer, and hot water are used as aqueous phase for oil recovery," J. Colloid Interface Sci. 2002, 246, 203-213. They conjectured that the reduction in the interfacial tension between the aqueous phase and oil was the cause of faster and improved oil recovery.

Onyekonwu et al. reported the performance of polysilicon nanoparticles for enhancing oil recovery. See Onyekonwu et al., "Investigating the use of nanoparticles in enhancing oil recovery," SPE 2010, http://dx.doi.org/10.2118/140744-MS. Three different types of polysilicon nanoparticles were used for the displacement experiments on water-wet rocks: lipophobic-hydrophilic (LHPN), hydrophobic-lipophilic (HLPN), and neutrally wet nanoparticles (NWPN). They found that NWPN and HLPN were good EOR agents in water-wet formations while LHPN yielded poor recovery factors indicating that its use for EOR should be restricted to oil-wet formations. These investigators inferred that EOR was due to both the reduction of interfacial tension and wettability change.

Hendraningrat et al. examined the ability of hydrophilic silica nanoparticles to improve oil recovery. See (i) Hendraningrat et al., "Effect of some parameters influencing enhanced oil recovery process using silica nanoparticles: An experimental investigation," SPE 2013, http://dx.doi.org/10.2118/165955-MS; (ii) Hendraningrat et al., "Enhancing oil recovery of low-permeability Berea sandstone through optimized nanofluids concentration," SPE 2013, http://dx.doi.org/10.2118/165283-MS; (iii) Hendraningrat et al., "A coreflood investigation of nanofluid enhanced oil recovery in low-medium permeability Berea sandstone," SPE 2013, http://dx.doi.org/10.2118/164106-MS; (iv) Hendraningrat et al., "A coreflood investigation of nanofluid enhanced oil recovery," J. Pet. Sci. Eng. 2013, 111, 128-138; and (v) Hendraningrat et al., "Effects of the initial rock wettability on silica-based nanofluid-enhanced oil recovery processes at reservoir temperatures," Energy Fuels 2014, 28, 6228-6241. Some parameters influencing EOR processes, such as the size and concentration of nanoparticles, initial core wettability, nanofluid injection rate and temperature were investigated. They concluded that oil recovery improves with increasing temperature, decreasing nanoparticle size and decreasing injection rate. Additionally, the highest oil recovery was obtained from intermediate-wet rocks. They showed that EOR using silica based nanofluid resulted from the medium becoming water-wet from its oil-wet state.

Moghaddam et al. compared eight different nanoparticles previously investigated in the literature. See Moghaddam et al., "Comparative study of using nanoparticles for enhanced oil recovery: Wettability alteration of carbonate rocks," Energy Fuels 2015, 29, 2111-2119. These nanoparticles were zirconium dioxide ($ZrO_2$), calcium carbonate ($CaCO_3$), titanium dioxide ($TiO_2$), silicon dioxide ($SiO_2$), magnesium oxide (MgO), aluminum oxide ($Al_2O_3$), cerium oxide ($CeO_2$), and carbon nanotube (CNT). The ability to alter wettability of carbonate rocks was studied. Based on their impact on wettability alteration and stability in brine, $CaCO_3$ and $SiO_2$ were selected for spontaneous imbibition tests and core flooding experiments. The results of both imbibition and core flooding experiments demonstrated that $SiO_2$ nanoparticles treatment improved oil recovery more than the treatment by $CaCO_3$ nanoparticles, though over a longer duration.

In summary, two classical mechanisms of EOR using nanofluids have been proposed, namely, the reduction of the interfacial tension between the aqueous phase and oil phase, and rock wettability alteration. In some instances, both mechanisms are believed to be operational. Despite recent interest in using nanofluid for EOR, the underlying operating mechanism of nanofluid is not well understood.

A new view of oil displacement from a solid substrate using a nanofluid was recently proposed by Wasan and Nikolov. See Wasan, D. T., and Nikolov, A. D., "Spreading of nanofluids on solids," Nature, 2003, 423, 156-159. In this paper, the nanoparticle structuring (layering) in the wedge film was advocated as the driving mechanism for the wettability alteration. They showed that nanoparticles (or surfactant micelles) form two-dimensional (2-D) layered structures in the confined three-phase (solid-oil-aqueous phase) contact region of the wedge film as illustrated in FIG. 1. The nanoparticle structuring phenomenon gives rise to the structural disjoining pressure (a force normal to the interface) in the wedge film with a higher disjoining pressure near the tip of the wedge than in the bulk meniscus. As a result, the oil-nanofluid interface moves forward with a progressive cleaving of the oil-solid contact eventually detaching the oil drop.

Kao et al. observed two distinct contact lines during the separation of crude oil droplets from a solid silica surface in the presence of a nanofluid (micellar solution) using a differential interference microscope: an outer one (between the oil, solid and water film) and an inner one (between the oil, solid and mixed oil/water film) as shown in FIG. 2. See Kao et al., "Mechanisms of oil removal form a solid surface in the presence of anionic micellar solutions," Colloids Surf. 1988, 34, 389-398. The spreading of a mixed oil/water film was later understood to be driven by the structural disjoining pressure gradient arising from the ordering of the micelles in the wedge-film region by Wasan and Nikolov.

Wasan, Nikolov, and their coworkers further noted that the dynamics of the inner contact line depend on the combination of the nanoparticle formulation, contact angle and the capillary pressure. See (i) Chengara et al., "Spreading of nanofluids driven by the structural disjoining pressure gradient," J Colloid Interface Sci. 2004, 280, 192-201; (ii) Kondiparty et al., "Wetting and spreading of nanofluids on solid surfaces driven by the structural disjoining pressure: Statics analysis and experiments," Langmuir 2011, 27, 3324-3335; (iii) Kondiparty et al., "Dynamic spreading of nanofluids on solids Part I: Experimental," Langmuir 2012, 28, 14618-14623; (iv) Liu et al., "Dynamic spreading of nanofluids on solids Part II: Modeling," Langmuir 2012, 28, 16274-16284; and (v) Wu et al., "Cleansing dynamics of oily soil using nanofluids," J. Colloid Interface Sci. 2013, 396, 293-306. A suitable combination of these factors accelerates the spreading of the nanofluid on the solid surface, thereby detaching the oily soil from the substrate.

The application of nanofluids was also explored for hydrocarbon recovery from oil saturated Berea sandstone. See Zhang et al., "Enhanced oil recovery (EOR) using nanoparticle dispersions: Underlying mechanism and imbibition experiments," Energy Fuels 2014, 28, 3002-3009. Compared to brine (containing 0.32 mol/L NaCl), an additional 30% of crude oil was recovered using a nanofluid developed by the Illinois Institute of Technology at a reservoir temperature of 55 OC.

High resolution X-ray microtomography (micro-CT) has been used extensively in the oil and gas industry for imaging, quantifying properties, and determining the distribution of fluids in porous rocks. See Dunsmuir, et al., "X-ray microtomography: a new tool for the characterization of porous media," SPE 22860, SPE 1991, http://dx.doi.org/10.2118/22860-MS. The main advantage of X-ray micro-CT is the non-destructive nature of the technique that allows 3D monitoring of internal structural changes at resolutions in the range of a few microns. See (i) Landis et al.," Mater Charact. 2010, 61, 1305-1316; and (ii) Auzerais et al., "Transport in sandstone: a study based on three dimensional microtomography," Geophys. Res. Lett. 1996, 23, 705-708.

Extensive research on imaging the residual non-wetting phase using micro-CT scanning at ambient conditions where the porous medium was strongly water-wet or oil-wet has been done. See (i) Wildenschild et al., "X-ray imaging and analysis techniques for quantifying pore-scale structure and processes in subsurface porous medium systems," Adv. Water Resour. 2013, 51, 217-246; (ii) Prodanovic et al., "3D image-based characterization of fluid displacement in a Berea core," Adv. Water Resour. 2007, 30, 214-226; (iii) Kumar et al., "Visualizing and quantifying the residual phase distribution in core material," Petrophysics 2010, 51, 323-332; (iv) Karpyn et al., "Experimental investigation of trapped oil clusters in a water-wet bead pack using X-ray microtomography," Water Resour. Res. 2010, 46, W04510; (v) Knackstedt et al., "Improved characterization of EOR processes in 3D. Characterizing mineralogy, wettability and residual fluid phases at the pore scale," SPE 2011, http://dx.doi.org/10.2118/145093-MS; (vi) Iglauer et al., "X-ray tomography measurements of power-law cluster size distributions for the nonwetting phase in sandstones," Phys. Rev. E 2010, 82, 056315; (vii) Landry et al., "Pore-scale analysis of trapped immiscible fluid structures and fluid interfacial areas in oil-wet and water-wet bead packs," Geofluids 2011, 11, 209-227; and (viii) Iglauer et al., "Comparison of residual oil cluster size distribution, morphology and saturation in oil-wet and water-wet sandstone," J. Colloid Interface Sci. 2012, 375, 187-192. Note that Karpyn et al. experimentally investigated trapped oil clusters in a water-wet bead pack subject to different flow conditions using X-ray microtomography. They presented oil cluster shape and size distribution and found an average cluster size of approximately five pores.

SUMMARY

A method and system is provided for recovery of oil from a subterranean reservoir by injecting nanofluid through at least one well that traverses the subterranean reservoir and into the subterranean reservoir at a controlled flow rate.

In one embodiment, the controlled flow rate can correspond to a capillary number of less than $10^{-6}$ (e.g., a capillary number of $10^{-7}$).

The method and system can further employ at least one injection well and at least one production well that traverse the subterranean reservoir, wherein the nanofluid is injected through the injection well and into the subterranean reservoir at the controlled flow rate.

In another embodiment, the controlled flow rate can correspond to an advection time scale $T_a$ that is greater than a nanofilm-formation time-scale $T_f$ (possibly greater than ten times the nanofilm-formation time-scale $T_f$). The advection time scale $T_a$ can be representative of the time period for a particle of the injected nanofluid to travel from the injection well through the subterranean reservoir to the production well. The advection time scale $T_a$ for a given flow rate of injected nanofluid can be dependent upon at least one of: the permeability distribution of the rock matrix of the reservoir, the design of the injection and production wells and possibly other factors. The advection time scale $T_a$ for a given flow rate of injected nanofluid can be derived by analysis or numerical simulation of a particular EOR installation. The nanofilm-formation time-scale $T_f$ can be representative of the time period for a thin film of the nanofluid to form and dislodge oil in the subterranean reservoir. The nanofilm-formation time-scale $T_f$ can be dependent upon at least one of: the mineralogy of the rock matrix of the reservoir, the composition of the oil in the reservoir, the composition of the injected nanofluid and possibly other factors.

The flow rate of the injected nanofluid can be controlled by manual or automatic adjustment of an injection pump pressure, an injection pump flow rate, and/or an injection choke valve setting.

The nanofluid injection can be part of a tertiary recovery mode operation (enhanced oil recovery) that follows a secondary recovery mode operation (such as a brine flood).

The nanofluid injection can also be part of a secondary recovery mode operation (enhanced oil recovery) that follows a primary recovery mode operation.

BRIEF DESCRIPTION OF THE DRAWINGS

FIG. 15A are side view images of a bead pack during a nanofluid flooding sequence; and FIG. 15B are images derived from a 3D model measured by an X-ray micro-CT facility. Note that darker regions are oil and lighter regions are the aqueous phase in FIGS. 15A and 15B.

DETAILED DESCRIPTION OF EXEMPLARY EMBODIMENT(S)

Figure 1:
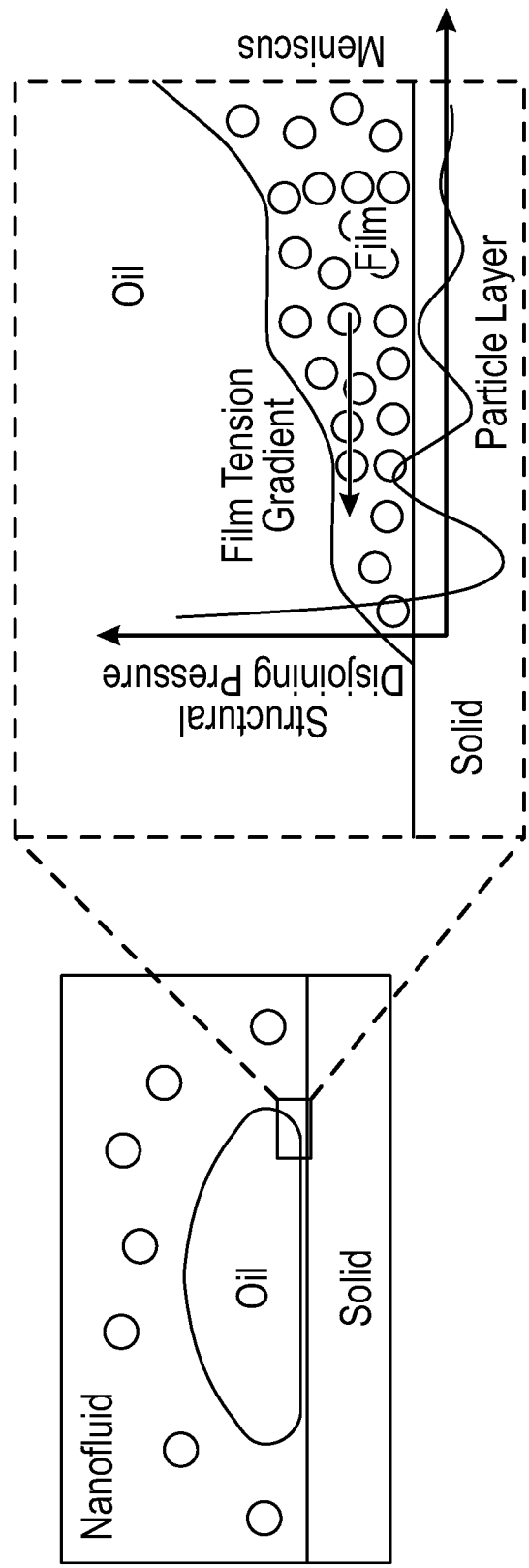
FIG. 1 is a schematic presentation of a mechanism of oil displacement driven by nanofluid structural disjoining pressure where nanofluid layering leads to a film tension gradient and drives oil displacement.
Figure 2:
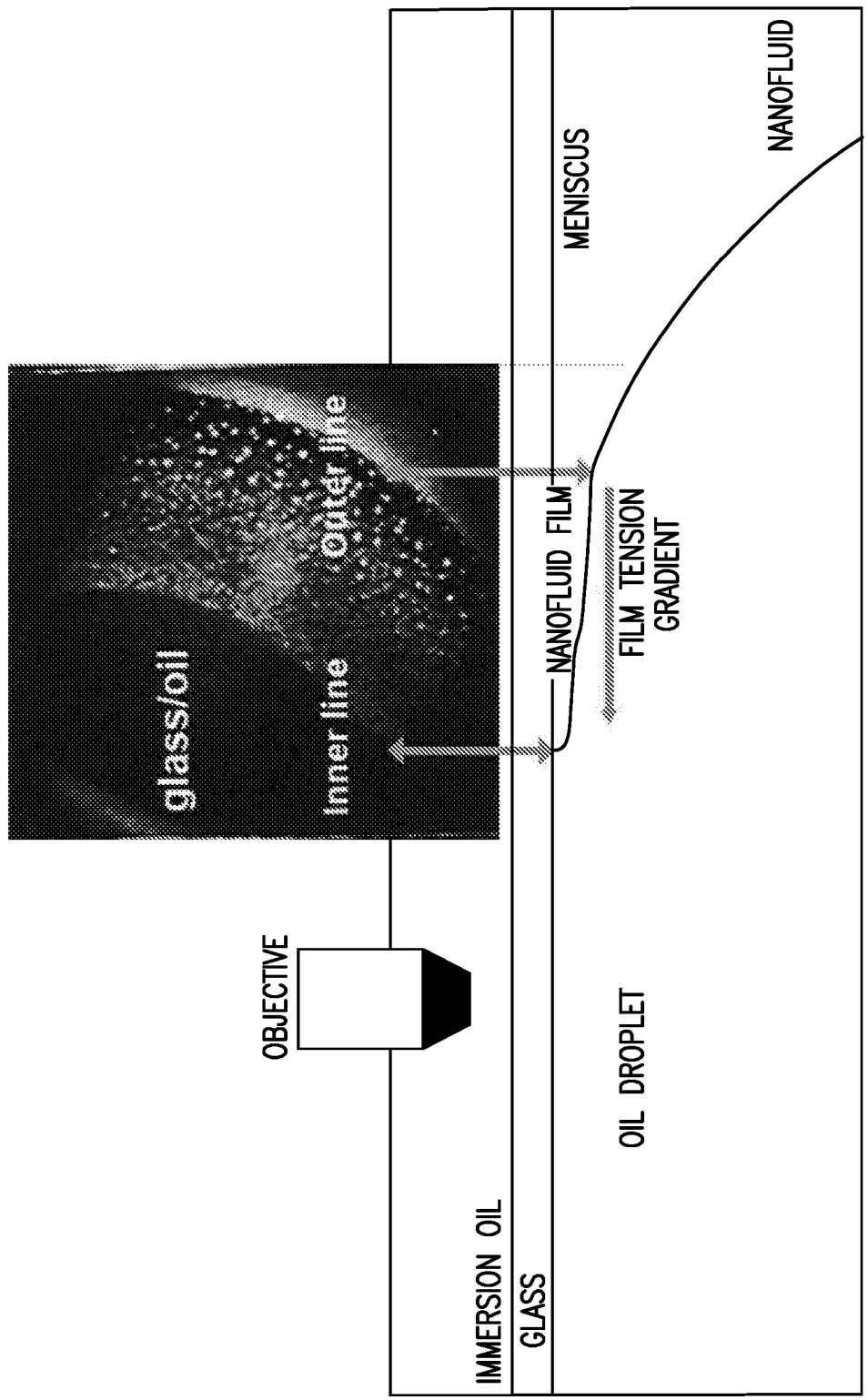
FIG. 2 is a photomicrograph taken by reflected-light interferometry and corresponding schematic illustration that depicts the nanofluid structural disjoining pressure on oil displacement dynamics; the "outer line" is the macroscopic three-phase contact line and the "inner line" depicts the advancing nanofluid film driven by structural disjoining pressure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the disclosure.

Specific details are given in the following description to provide a thorough understanding of the embodiments. However, it will be understood by one of ordinary skill in the art that the embodiments may be practiced without these specific details. For example, systems, processes, and other elements may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the description may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the present disclosure, nanofluid means a fluid containing nanoparticles, which are particles that are 1 to 100 nm in size. These fluids are engineered colloidal suspensions of nanoparticles in a base fluid, such as water or brine. For EOR applications, nanofluids have been investigated that include nanoparticles made from a variety of materials, such as zirconium dioxide, calcium carbonate, titanium dioxide, silicon dioxide, magnesium oxide, aluminum oxide, cerium oxide, antimony dioxide, carbon nanotubes, polymers and other materials.

The embodiments of the present disclosure as described herein relate to EOR processes using injected nanofluid at a controlled flow rate. Embodiments also relate to the removal of trapped oil ganglia (or clusters) formed by low capillary number brine flooding by injecting nanofluids into the porous medium and comparing the results to brine injection at various capillary numbers. The embodiments of the present disclosure also relate to distinguishing oil recovery induced by wettability change due to structural disjoining pressure from oil recovery induced by change of interfacial tension.

It was found that additional oil recovery was enabled by the presence of nanofluid, the incremental recovery decreased with increasing capillary number, while the total oil recovered showed a slight decrease. This non-intuitive result is understood by considerations of nanofluid film formation time-scales in relation to advection time-scale. The present disclosure provides detailed images of residual oil from X-ray micro-CT, both with nanofluid and brine, and contrasts the results by relating them to wettability.

The oil referred to in this disclosure is Cargille immersion liquid, which is available from Cargille Laboratories, NJ, USA. Properties of the Cargille immersion liquid are given in Table 1 below:

TABLE 1

| Oil Properties (25° C., 1 atm pressure) | |
| --- | --- |
| Density, g mL$^{-1}$ | 0.854 |
| Viscosity, Pa s | 0.0181 |
| Surface tension, mN m$^{-1}$ | 29.4 |
| Refractive index | 1.474 |

A small amount (100 ppm) of Oil Red EGN dye, which is available from Aldrich Chemical Co., Milwaukee, Wis., was added to the oil referred to in this disclosure for visual contrast and, therefore, observational ease. The oil is selected to mimic petroleum oil that can be found in subterranean reservoirs (formations).

The brine referred to in this disclosure was prepared by dissolving sodium chloride (NaCl), which is commercially available from Fisher Scientific, USA, in deionized (DI) water. The concentration of NaCl was 0.25 wt % of solution. The density of the brine was 0.99±0.01 g/cm$^3$ and the pH of the brine was 6.5±0.5 at 22° C. and 1-atm pressure. The brine is selected to mimic displacing fluid (also referred to as injection fluid) commonly used in enhanced oil recovery operations.

The sodium dodecyl sulfate (SDS, VWR Scientific, USA) solution referred to in this disclosure was prepared by dissolving SDS in brine solution. The concentration of SDS is 1.35 mM. The SDS solution has the same interfacial tension with oil as that of the nanofluid.

The nanofluid used in the experiments described in this disclosure is a nanofluid developed by the Illinois Institute of Technology. The nanofluid includes particles made from polyethylene glycol. The polyethylene glycol is dispersed in brine and is 10% by volume of the nanofluid. However, other nanofluids (polymeric or non-polymeric) can be used to recover oil in accordance with embodiments of the present disclosure. Most reservoir environments are at high temperature, pressure, and salinity. Most nanofluids, such as silica nanoparticle dispersions are unstable and agglomerate in such reservoir environments. The nanofluid used in the experiments is stable with respect to electrolytes or temperature. The nanofluid was prepared in brine solution, and in order to enhance the effect of the structural disjoining pressure on the oil recovery process, the nanofluid composition was selected based on a multistep process. See (i) Zhang et al., "Enhanced oil recovery (EOR) using nanoparticle dispersions: Underlying mechanism and imbibition experiments," Energy Fuels 2014, 28, 3002-3009; and (ii) Nikolov et al., "The dynamics of capillary-driven two-phase flow: The role of nanofluid structural forces," J. Colloid Interface Sci. 2015, 449, 92-101. The density of the nanofluid was 1.00±0.01 g mL$^{-1}$ with a pH=6.5±0.5 at 22° C. at 1 atm pressure.

Figure 3:
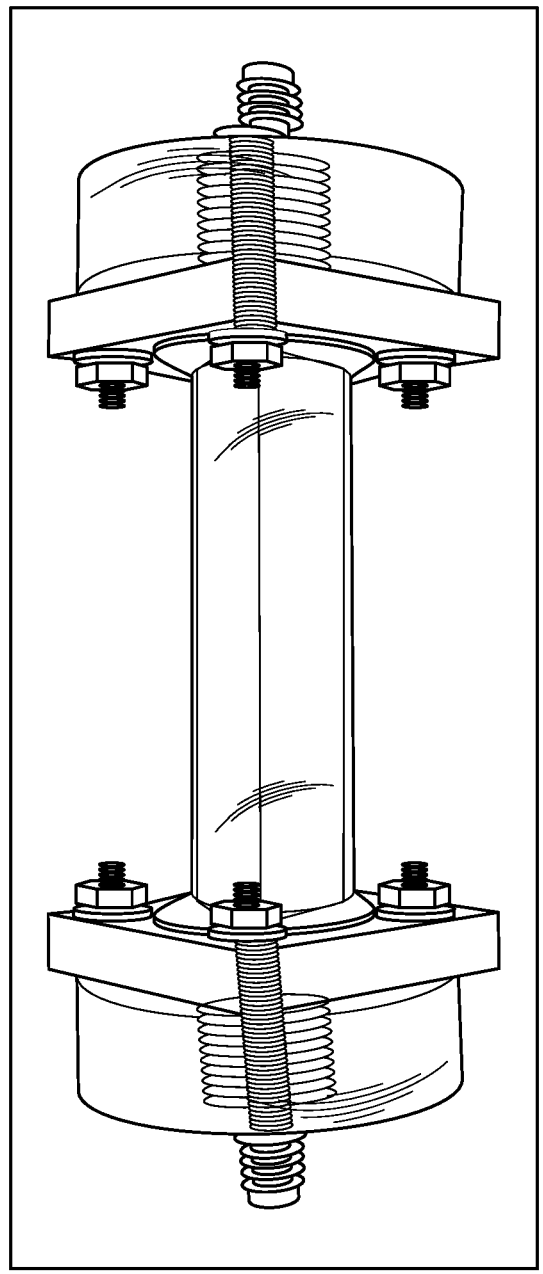
FIG. 3 is a photo of a sintered bead pack with mixture of 1 mm and 250-300 μm borosilicate glass beads.

A quartz tube was filled with borosilicate glass beads of two different diameters of 1 mm and 250-300 μm (1:1 by volume ratio) and sintered in an oven at about 830° C. The resultant assembly is referred to as a bead pack herein. FIG. 3 shows a picture of the assembled bead pack. The overall porosity of the bead pack was determined in an AccuPyc 1330 Pyconometer (Micromeritics Instrument Corporation) and double checked by an X-ray micro-CT scanned images and threshold processing using Otsu's algorithm. See Otsu N., "A threshold selection method from gray-level histograms," IEEE Trans. Sys., Man. Cyber. 1979, 9, 62-66. The porosity measured by pyconometer is 28.2±1.2% compared to 28.6% by micro-CT scan. A permeability of 54.73 Darcy for the bead pack was measured experimentally by draining water from a hydrostatic column through the bead pack. The bead pack is a porous medium selected to mimic the rock matrix that can hold petroleum oil in a subterranean reservoir.

At the conclusion of each flooding experiment described herein, the bead pack was cleaned by sequentially flushing the medium with isopropanol, toluene, and isopropanol to restore wettability. After drying the bead pack overnight, the same pack was used for the next flooding experiment. Thus, the pore structure of the porous medium was unaltered in the sequence of experiments. The cleaning procedure was chosen to make sure that the wettability of glass beads was the same for each flooding experiment. This was confirmed by measuring water contact angle of 27±3° on clean glass beads in air. After exposure to oil, and following the above-mentioned flushing steps and air drying, water contact angle (with respect to air) was measured to be 29±3°, essentially restoring the contact angle to its original state.

The classical method of drop-shape analysis was used to calculate the interfacial tension of the oil/brine solution, oil/nanofluid solution, and oil/SDS solution. The detailed procedure on the measurement can be found in Zhang et al. "Enhanced oil recovery (EOR) using nanoparticle dispersions: Underlying mechanism and imbibition experiments," Energy Fuels 2014, 28, 3002-3009. The measured interfacial tensions of the oil/brine solution, oil/nanofluid solution, and oil/SDS solution are 43±2 mN m$^{-1}$, 8.8±0.3 mN m$^{-1}$ and 8.7±0.3 mN m$^{-1}$ respectively.

Pre-cleaned borosilicate glass substrates were placed in a transparent plastic cuvette filled with oil (without dye). The glass substrates were cleaned sequentially with isopropanol, toluene and isopropanol followed by air drying overnight. A sessile droplet of brine or nanofluid (0.3±0.05 mL, with methylene blue dye) was placed on the glass substrate immersed in the oil with a Hamilton microsyringe (B-D needle, 25 G ⅝). After placing the droplet on the glass substrate, the image of the droplet on the glass substrate was captured with a digital camera (Canon A720 IS) until the droplet stopped spreading. The static three-phase contact angle for brine and nanofluid is 65±4° and 25±3° respectively.

The advancing and receding contact angle was measured by the tilting plate method. Basically, after the deposited droplet stopped spreading on the glass substrate, the sample was tilted slowly until the sessile drop began to move in the downhill direction. The downhill contact angle is the advancing angle and the uphill angle is the receding contact angle. The contact angle was calculated by image analysis (Image Pro, version 6). The measured brine advancing and receding contact angle is 88±2° and 42±3°, respectively, and nanofluid advancing and receding contact angle is 25±3° and 22±3°, respectively. All of the experiments were conducted at a room temperature of 22±1° C.

The aim of the flooding experiments described herein was to compare and contrast EOR processes with and without nanofluid as a function of capillary number (Ca). All of the flooding experiments were conducted at room temperature (22±1° C.).

Figure 4:
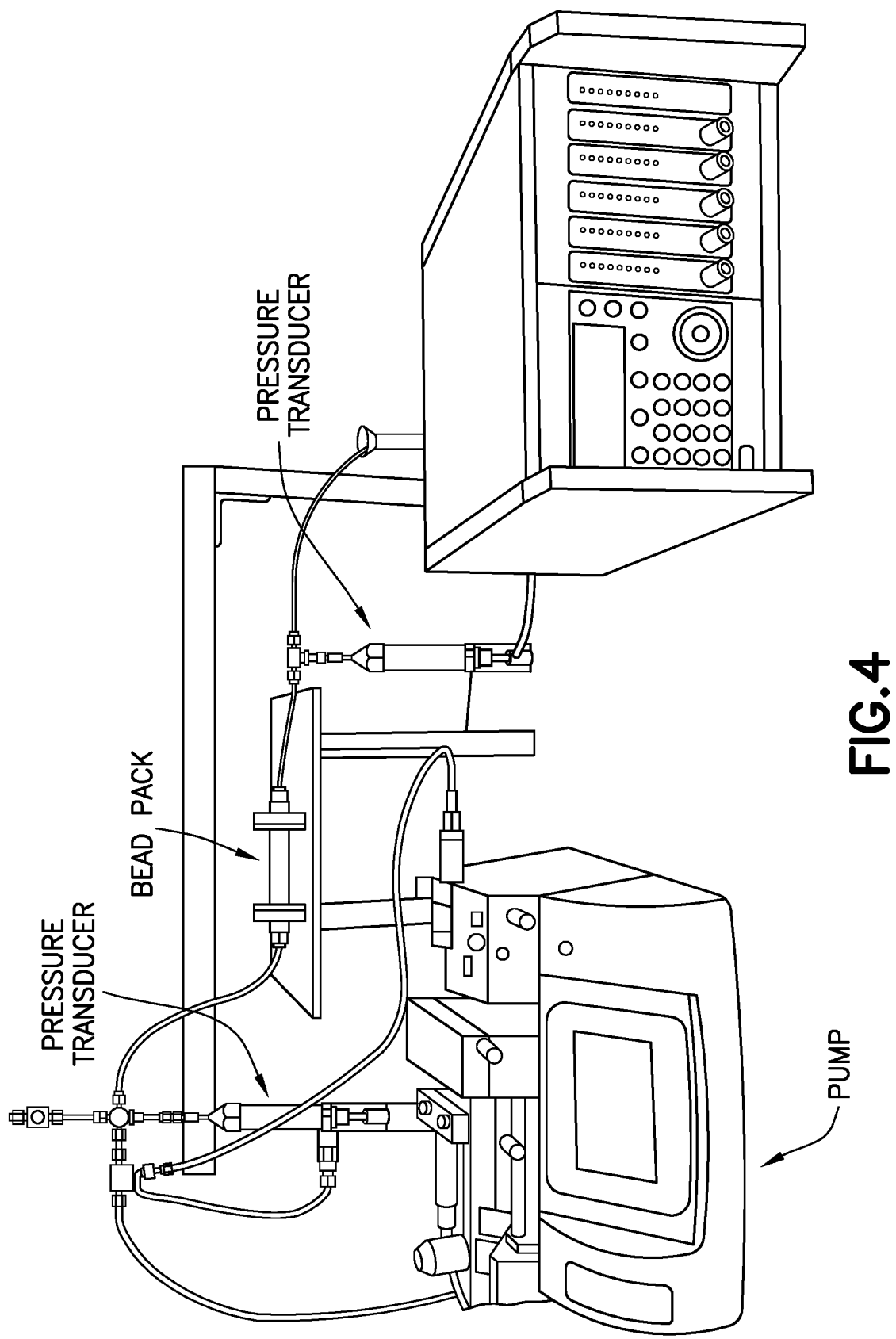
FIG. 4 is a photo of an apparatus and experimental setup for the flooding experiments of the present disclosure.

FIG. 4 shows the experimental setup, which includes syringe pumps, pressure transducers, the bead pack, stainless syringes and ⅛" (3.175 mm) PFA tubings. The syringe pumps (Harvard Apparatus) were operated at controlled flow rates. The pump reproducibility is ±0.05%. Using a 20 mL stainless steel syringe, the pump's minimum and the maximum flow rates are 52.86 nL/min and 54.89 mL/min respectively. The inlet and outlet of the bead pack were connected to pressure transducers to measure the pressure drop across the bead pack during the flooding experiments.

The capillary number is proportional to the ratio of viscous flow induced pressure drop to capillary pressure. By definition, the capillary number (Ca) may be given as:

$$Ca = \frac{\mu U}{\gamma} \quad (1)$$

where μ is the fluid viscosity, U is the superficial velocity, and γ is the interfacial tension between the aqueous phase and oil.

Note that contact angle is not included in the calculation of the capillary number (Ca), since the primary purpose is to delineate the effects of wettability alteration due to structural disjoining pressure as discussed further below. During oil recovery, the displacing fluid is synonymous with brine and/or nanofluid (w is used as a subscript) and the displaced fluid is oil (o is the subscript). An EOR process can include a tertiary recovery mode where a flood that employs nanofluid follows a secondary recovery mode that employs brine. In the secondary recovery mode, the brine is injected into the subterranean reservoir through one or more injection wells located in rock that has fluid communication with one or more production wells. The purpose of secondary recovery mode is to maintain reservoir pressure and to displace oil toward the production well(s). It is also possible to add an EOR agent before a brine flood. This will be a secondary EOR process.

In order to simulate an oil reservoir, a pre-evacuated bead pack is filled with brine in order to avoid trapped air bubbles. Oil is then injected at a sufficiently high rate so that the capillary number is about $10^{-4}$. The primary purpose of injecting oil at this high rate is to reduce the zone of end-effect. See Ramakrishnan et al., "A new technique to measure static and dynamic properties of a partially saturated porous medium," Chem. Eng. Sci. 1991, 46, 1157-1163. The effluent brine and oil are collected, and thus the saturation of oil and brine are known. At this point, the bead pack is filled predominantly with oil except for a residual brine saturation, $S_{wr}$, of 15-20%.

In order to simulate oil recovery employing a secondary recovery mode involving water flooding, three to four pore volumes (PV) of brine are injected into the oil-filled bead pack at a low capillary number of Ca=$10^{-7}$. At the end of this step, no oil production was observed. Oil production and the pressure drop across the bead pack were recorded as a function of pore volumes. Thus, secondary water-flood residual oil saturation was established. The three steps of evacuation, oil intrusion and low capillary number water-flood were the same for each flooding experiment; results of which are presented below.

In order to simulate an enhanced oil recovery process employing a tertiary recovery mode involving nanofluid flooding, nanofluid was injected at different capillary numbers (Ca=$10^{-7}$, Ca=$10^{-5}$, and Ca=$10^{-4}$) over a range of three to seven PV following the low capillary number secondary water-flooding step. For each experiment, the nanofluid injection was terminated when no discernible oil was evident in the outlet stream. Oil cut and pressure were recorded. At the conclusion of the nanofluid flooding, the bead pack was cleaned by sequentially flushing with isopropanol, toluene and isopropanol, essentially restoring the contact angle to its original state. For nanofluid injection, note that this process was unusual for the case employing the low capillary number (Ca=$10^{-7}$) because this value is typical of a secondary water-flood and not a tertiary recovery mode, where the capillary numbers are usually above $10^{-4}$.

In order to compare the simulated tertiary recovery mode involving nanofluid flooding with simulated tertiary recovery mode involving brine flooding, brine was injected at different capillary numbers (Ca=$10^{-7}$, Ca=$10^{-5}$, and Ca=$10^{-4}$) over a range of three to seven PV following the low capillary number water-flooding step. For each experiment, the brine injection was terminated when no discernible oil was evident in the outlet stream. Oil cut and pressure were recorded. At the conclusion of the tertiary recovery mode brine flooding, the bead pack was cleaned by flushing the bead pack medium with isopropanol, toluene, and isopropanol, essentially restoring the contact angle to its original state. In order to delineate the effect of reduced capillarity from that of wettability (other than inevitable changes through dynamic contact angle), no surfactant was added in the brine for the tertiary brine flooding.

Figure 5:
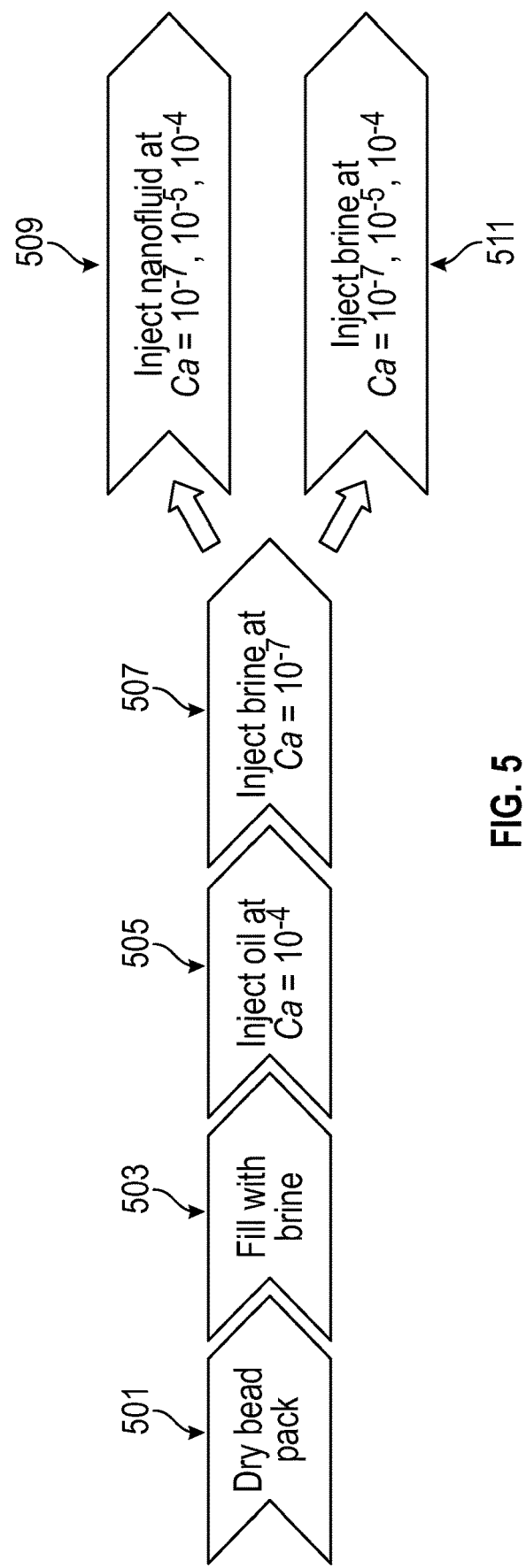
FIG. 5 is a schematic representation of experimental procedures that simulate different tertiary recovery mode processes.

FIG. 5 is a schematic diagram that illustrates an experimental procedure that simulates different tertiary recovery mode processes employing nanofluid flooding and brine flooding at different capillary numbers (Ca=$10^{-7}$, Ca=$10^{-5}$, and Ca=$10^{-4}$).

In 501, the bead pack is evacuated and dried.

In 503, the bead pack is filled with brine in order to avoid trapped air bubbles.

In 505, oil is injected into the bead pack at a sufficiently high rate so that the capillary number is about $10^{-4}$. At this point, the bead pack is filled predominantly with oil except for residual brine saturation, $S_{wr}$, of 15-20%.

In 507, three to four pore volumes (PV) of brine are injected into the oil-filled bead pack at a low capillary number of Ca=$10^{-7}$. This operation simulates oil recovery employing a secondary recovery mode involving water flooding.

In 509, nanofluid is injected into the bead pack at different capillary numbers (Ca=$10^{-7}$, Ca=$10^{-5}$, and Ca=$10^{-4}$) over a range of three to seven PV following the brine injection of 507. This operation simulates oil recovery employing a tertiary recovery mode involving nanofluid flooding. For each experiment, the nanofluid injection was terminated when no discernible oil was evident in the outlet stream. Oil cut and pressure were recorded. At the conclusion of the nanofluid flooding, the bead pack was cleaned by sequentially flushing with isopropanol, toluene and isopropanol, essentially restoring the contact angle to its original state.

In 511, brine is injected into the bead pack at different capillary numbers (Ca=$10^{-7}$, Ca=$10^{-5}$, and Ca=$10^{-4}$) over a range of three to seven PV following the brine injection of 507. This operation simulates oil recovery employing a tertiary recovery mode involving water flooding. For each experiment, the brine injection was terminated when no discernible oil was evident in the outlet stream. Oil cut and pressure were recorded. At the conclusion of the brine flooding, the bead pack was cleaned by sequentially flushing with isopropanol, toluene and isopropanol, essentially restoring the contact angle to its original state.

The displacement efficiency $E_D$ for the different tertiary recovery mode processes can be calculated and evaluated based on the following:

$$E_D = \left[ 1 - \left(\frac{S_{or2}}{S_{or1}}\right) \right], \quad (2)$$

where $S_{or1}$ represents the oil saturation after the secondary brine injection of 507 at Ca=$10^{-7}$, and $S_{or2}$ represents the residual oil saturation after the tertiary nanofluid injection of 509 or the tertiary brine injection of 511.

A high-resolution X-ray microtomography (X-ray micro-CT) can be used to carry out an imaging process to determine oil and brine (nanofluid) distributions in the bead pack before and after injecting the brine and/or nanofluid displacing fluid. The micro-CT system consists of an X-ray generator, a detector, a translation/rotation system, and a computer system that controls motions, data acquisition and reconstruction. Once the bead pack sample is brought to its position and the scanner is activated, the projections of the magnified bead pack sample are captured by the image intensifier. When the source is active, the X-rays penetrate through the bead pack sample and reach the image intensifier, which converts X-ray energy into a form of light that is captured by a digital camera. The digitized data are sent to the computer and turned into raw files that can be processed into images. See Alvarado et al., "Visualization of three phases in porous media using microcomputed tomography," Petrophysics 2004, 48, 490-498. The images are stored as a stack of virtual 2D slices (a total of 3142 slices). The bead pack sample is rotated 360° in the X-ray beam while the detector provides attenuation views to the data acquisition computer. After the scan is complete, the 2D slices are reconstructed to form a 3D model of the bead pack sample using VG studio Max 2.2. The standard scanning parameters in the present cases were: four frames per projection, exposure time one second, angle of rotation 360°, X-ray tube voltage 160 kV and current 65 μA.

Figure 6A:
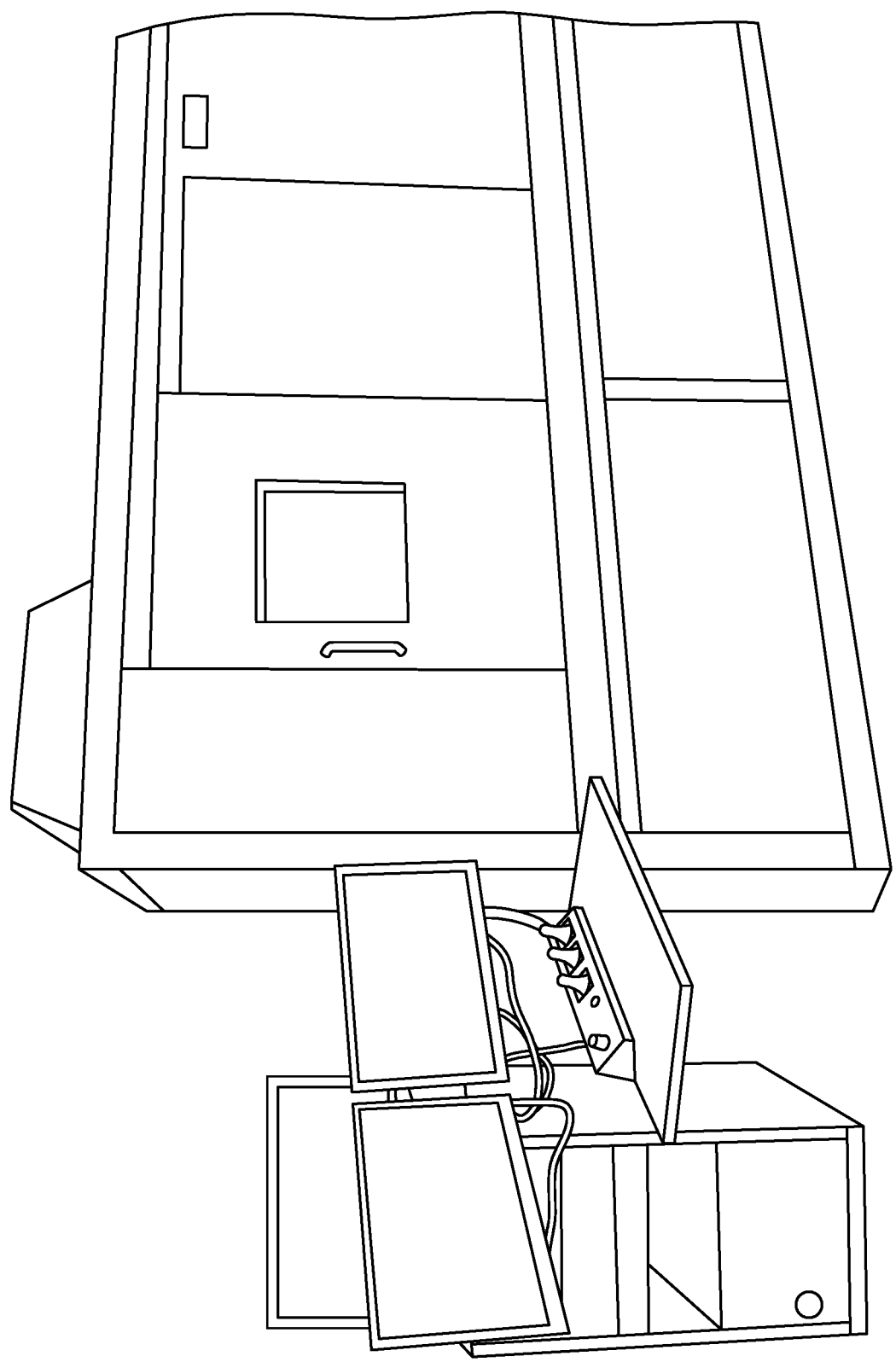
FIG. 6A is a photo of an X-ray micro-CT facility used in an imaging process.
Figure 6B:
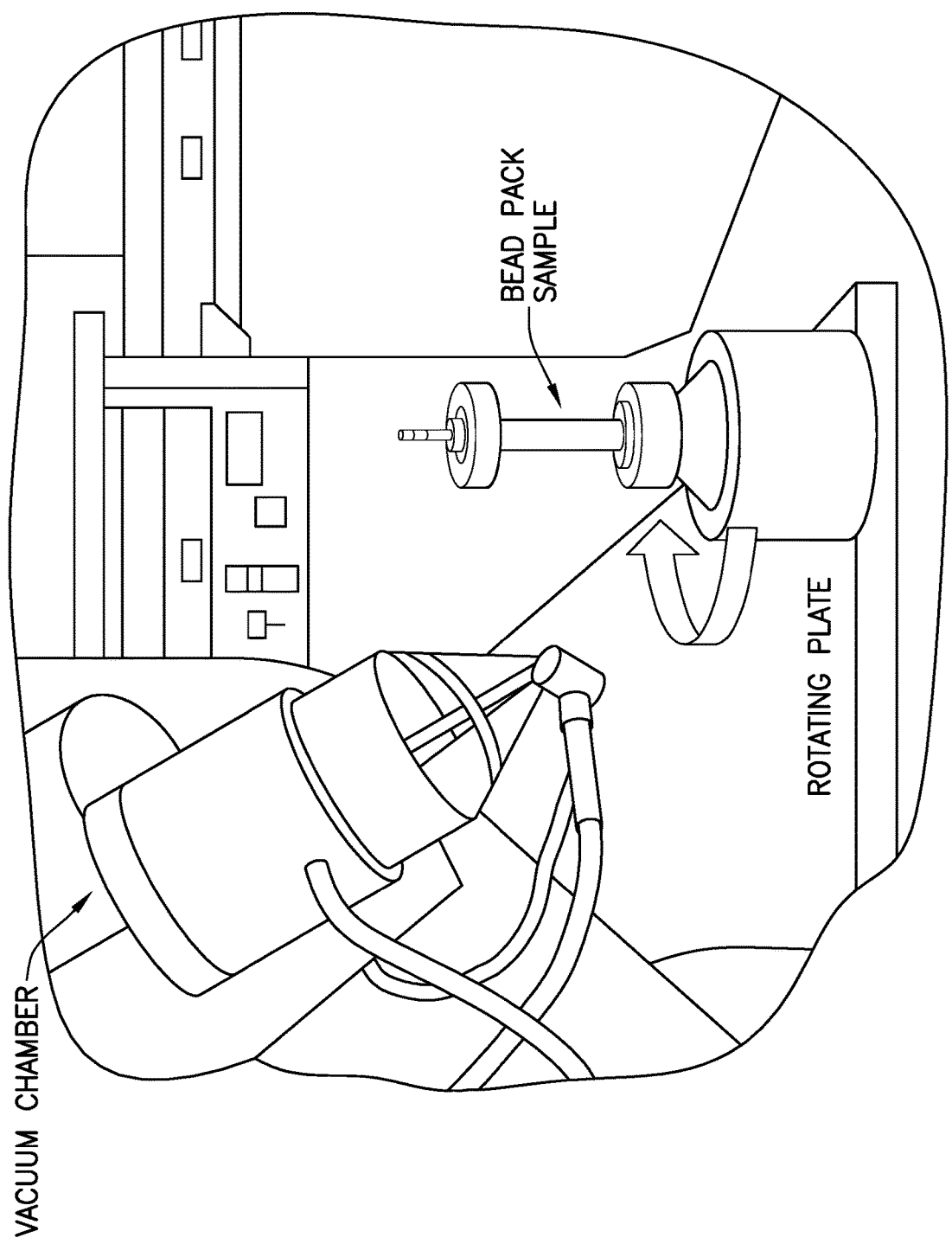
FIG. 6B is a photo of the inside of the X-ray micro-CT facility during scanning.

FIGS. 6A and 6B show the X-ray micro-CT facility during the imaging process. Initially, the dry bead pack was scanned to obtain the overall porosity. After the bead pack reached oil and brine saturation, it was scanned again to get initial oil and brine distribution. For the different tertiary recovery mode processes, the bead pack was scanned before and after the tertiary mode fluid injection to map the oil distribution in order to see the performance of nanofluid compared to that of brine. A digital camera (Canon Power-Shot A720 IS) equipped with a 58 mm macro-lens was also used to take pictures from the side of the bead pack at the end of each PV of flooding.

Figure 7:
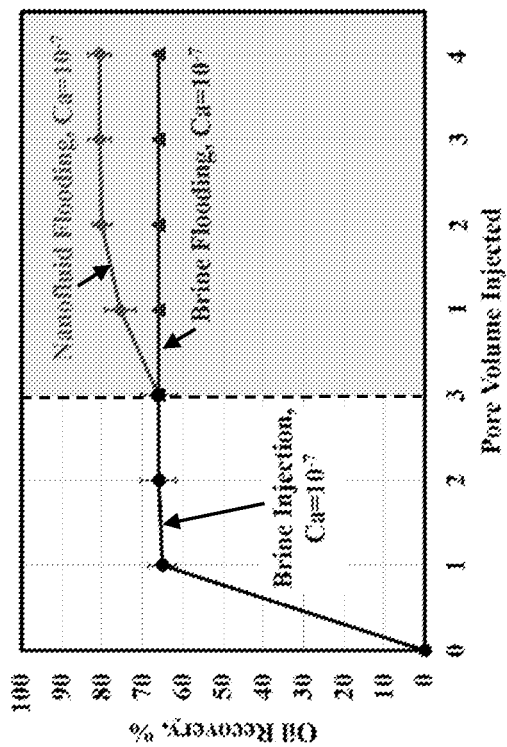
FIG. 7 shows two plots illustrating experimental results of oil recovery versus injected displacing fluid pore volume (PV) for secondary brine injection followed by tertiary nanofluid or brine injection at a capillary number (Ca) of $10^{-7}$ and a temperature (T) of 22±1° C.
Figure 10:
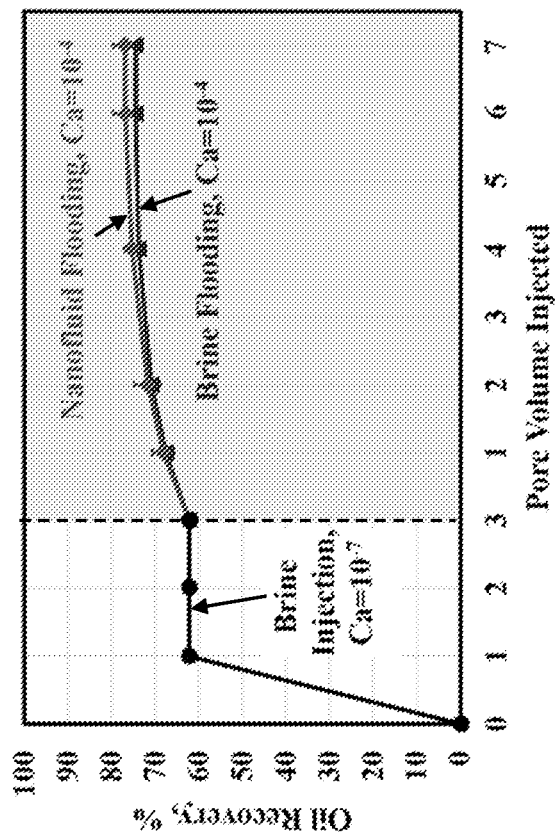
FIG. 10 shows two plots illustrating experimental results of oil recovery versus injected displacing fluid pore volume (PV) for secondary brine injection followed by tertiary nanofluid or brine injection at a capillary number (Ca) of $10^{-4}$ and a temperature (T) of 22±1° C.
Figure 9:
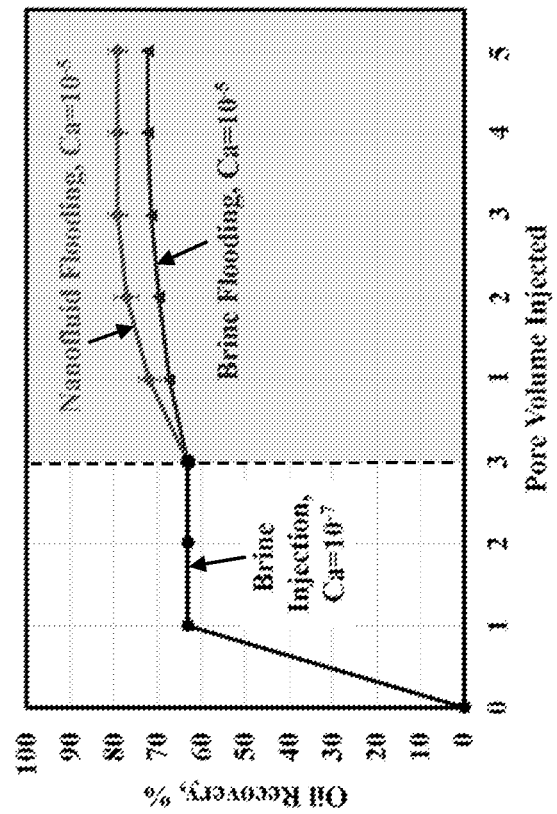
FIG. 9 shows two plots illustrating experimental results of oil recovery versus injected displacing fluid pore volume (PV) for secondary brine injection followed by tertiary nanofluid or brine injection at a capillary number (Ca) of $10^{-5}$ and a temperature (T) of 22±1° C.

FIGS. 7, 9 and 10 show the oil recovery versus pore volume of injected displacing fluid for the different tertiary recovery mode processes. FIG. 7 shows the oil recovery versus pore volume of injected displacing fluid for the tertiary recovery mode employing either nanofluid injection (509) or brine injection (511) at a capillary number (Ca) of $10^{-7}$. FIG. 9 shows the oil recovery versus pore volume of injected displacing fluid for the tertiary recovery mode employing either nanofluid injection (509) or brine injection (511) at a capillary number (Ca) of $10^{-5}$. FIG. 10 shows the oil recovery versus pore volume of injected displacing fluid for the tertiary recovery mode employing either nanofluid injection (509) or brine injection (511) at a capillary number (Ca) of $10^{-4}$.

Figure 8:
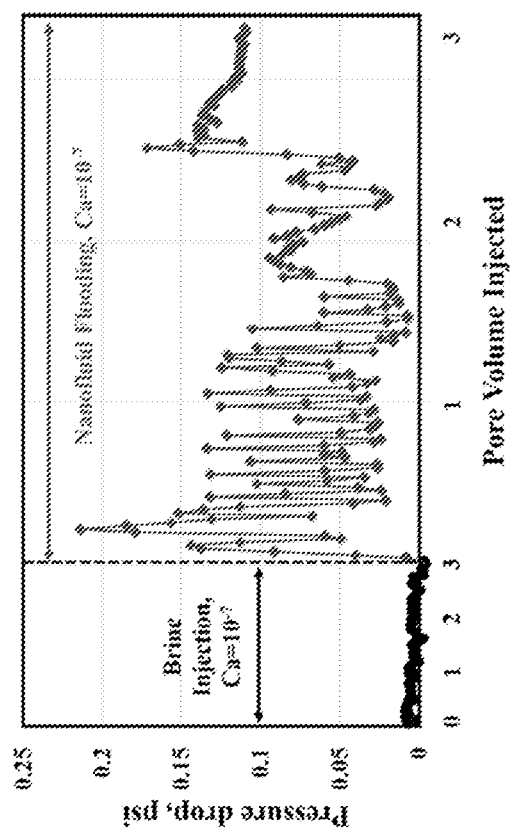
FIG. 8 shows a plot illustrating experimental results of pressure drop across the bead pack during secondary brine injection followed by tertiary nanofluid injection at a capillary number (Ca) of $10^{-7}$ and a temperature (T) of 22±1° C.

From FIG. 7, it can be observed that around 65% oil was displaced by the secondary brine injection of 507. Oil production ceased at about 1 PV, but in order to standardize the procedure, the secondary brine injection was continued until about 3 PV of brine was injected. After the secondary brine injection, a tertiary recovery mode employing injection of nanofluid at a capillary number of Ca=$10^{-7}$ was carried out for one experiment of 509. Similarly, a tertiary recovery mode employing injection of brine at a capillary number of Ca=$10^{-7}$ was carried out for one experiment of 511. Interestingly, 14.6% of additional oil was recovered using the tertiary nanofluid injection at Ca=$10^{-7}$ (509) as compared to 0% using the tertiary brine injection at Ca=$10^{-7}$ (511). FIG. 8 shows the pressure drop across the porous medium during the secondary brine injection and the tertiary nanofluid injection at Ca=$10^{-7}$ of the top curve of FIG. 7. Note that it can be observed that the average pressure drop was almost constant during the secondary brine injection and the value is close to zero since the permeability of the bead pack is large and is approximately 55 D (Darcy). The pressure drop increased and was oscillatory during the tertiary nanofluid injection at Ca=$10^{-7}$. The oscillation in the pressure is primarily due to continuous displacement of oil from glass beads and the movement of oil blobs within the bead pack. The trapped oil ganglia inside the bead pack started to break into disconnected oil blobs, and was continuously perturbed and displaced as the nanofluid injection was carried out. This was confirmed by the micro-CT images as described below, which highlight the differences between brine and nanofluid flooding.

The outcome of the processes of FIGS. 9 and 10 were expected to clearly delineate the difference between reduced capillarity without wettability change, and increased oil recovery including wettability change. FIG. 9 shows additional oil recovery due to tertiary nanofluid injection at Ca=$10^{-5}$ (509) is around 6.9% more than the additional oil recovery due to tertiary brine injection at Ca=$10^{-5}$ (511). FIG. 10 shows additional oil recovery due to tertiary nanofluid injection at Ca=$10^{-4}$ (509) is around 2.4% more than the additional oil recovery due to tertiary brine injection at Ca=$10^{-4}$ (511). This is a downward trend with respect to incremental oil production. But the interesting observation is that with respect to the capillary number Ca, even the total oil produced showed a slight decrease to no change after tertiary injection of nanofluid. The results of the different tertiary recovery mode processes are presented in Table 2 below:

TABLE 2

Results of the different tertiary recovery mode processes

| Secondary process Oil recovery after 3 PV brine injection at Ca = $10^{-7}$, % | Tertiary process (EOR) | | |
|---|---|---|---|
| | Ca | Oil recovery after brine flooding, % | Oil recovery after nanofluid flooding, % | additional oil compared with brine, % |
| 65.0 ± 3 | $10^{-7}$ | 0 | 14.6 ± 1.5 | 14.6 ± 1.5 |
| 63.2 ± 2 | $10^{-5}$ | 9.1 | 16.0 | 6.9 |
| 62.2 ± 2 | $10^{-4}$ | 12.3 | 14.7 | 2.4 |

As seen from Table 2, oil recovery from the tertiary recovery mode employing nanofluid injection decreases as compared to the oil recovery from the tertiary recovery mode employing brine injection as the capillary number is increased, which is contrary to intuitive expectation of improved oil displacement. It is in the limit of low capillary number that the highest additional recovery of 14.6% was obtained. This is to be tempered by the fact that the enhanced brine flood also recovers extra oil, and therefore the residual oil at the onset of nanofluid flooding is lower than in the lower capillary number floods. But even as a percentage of oil recovered by nanofluid with respect to oil left behind by brine, it can be seen that that increasing the capillary number decreases efficacy.

Similar results have been observed recently by other researchers showing that increasing silica nanofluid injection rate significantly decreases incremental oil recovery. See Hendraningrat et al., "Effect of some parameters influencing enhanced oil recovery process using silica nanoparticles: An experimental investigation," SPE 2013, http://dx.doi.org/10.2118/165955-MS. In some cases, they observed that there was no incremental oil recovery. Their explanation was that increasing the injection rate might affect nanoparticle accumulation near the core inlet rather than flowing through the pore throat. They observed visually that nanoparticles' 'cake' at core inlet was more noticeable at higher injection rate. The situation is different in our case. The bead pack is more porous than the core samples used by the other researchers. Specifically, the permeability is around 1000 times larger and the porosity is around 2 times higher. In addition, aggregates are not observed at the inlet. The reason why nanofluid performs best at low capillary number (at Ca=$10^{-7}$) is that nanofluid requires time for structural disjoining pressure to dislodge oil; for example, it takes around 9 hours for 1 PV nanofluid flooding at Ca=$10^{-7}$, while it takes only around 30 seconds for 1 PV nanofluid flooding at Ca=$10^{-4}$. Thus, the time-scale for structural disjoining pressure mechanism to operate may be taken into account since the inner contact line moves much slower than the outer contact line, the latter being driven by capillarity. In our case, the velocity of the inner contact line as measured is 0.032 mm/min and 0.32 mm/min for the outer contact line.

The apparent decrease in efficacy of the nanofluid injection with increasing capillary number is best understood by comparing advection and nanofilm-formation time-scales, $T_a$ and $T_f$ respectively. The advection time-scale $T_a$ is dependent on the flow rate of the injected nanofluid, and is representative of the time period for a particle of the injected nanofluid to travel through the bead pack. The nanofilm-formation time-scale $T_f$ is independent of the flow of the injected nanofluid and is representative of the time period for a thin film of the nanofluid to form and dislodge oil in the bead pack. In order for the structural disjoining pressure to operate, the advection time-scale $T_a$ should be larger than the nanofilm-formation time-scale $T_f$, i.e., $T_a \gg T_f$. For a bead pack with length L, porosity φ, and superficial velocity U, the advection time-scale $T_a$ is given as $$T_a = \frac{L\phi}{U}.$$

The nanofilm-formation time-scale $T_f$ is given as $$T_f = \frac{D_P}{v_{in}},$$

where $D_p$ is bead diameter and $v_{in}$ is inner contact line velocity. Table 3 summarize these results.

TABLE 3

Characteristic Time of Nanofluid Advection along the Bead Pack and Nanofluid Film Formation vs. Capillary Number

| Ca | $T_a$, min | $T_f$, min |
|---|---|---|
| $10^{-7}$ | 363.70 | 31.3 |
| $10^{-5}$ | 3.64 | |
| $10^{-4}$ | 0.36 | |

From Table 3, note that only the lowest capillary number of $10^{-7}$ has $T_a \gg T_f$, which also corresponds to highest EOR by nanofluid compared with brine.

Figure 11:
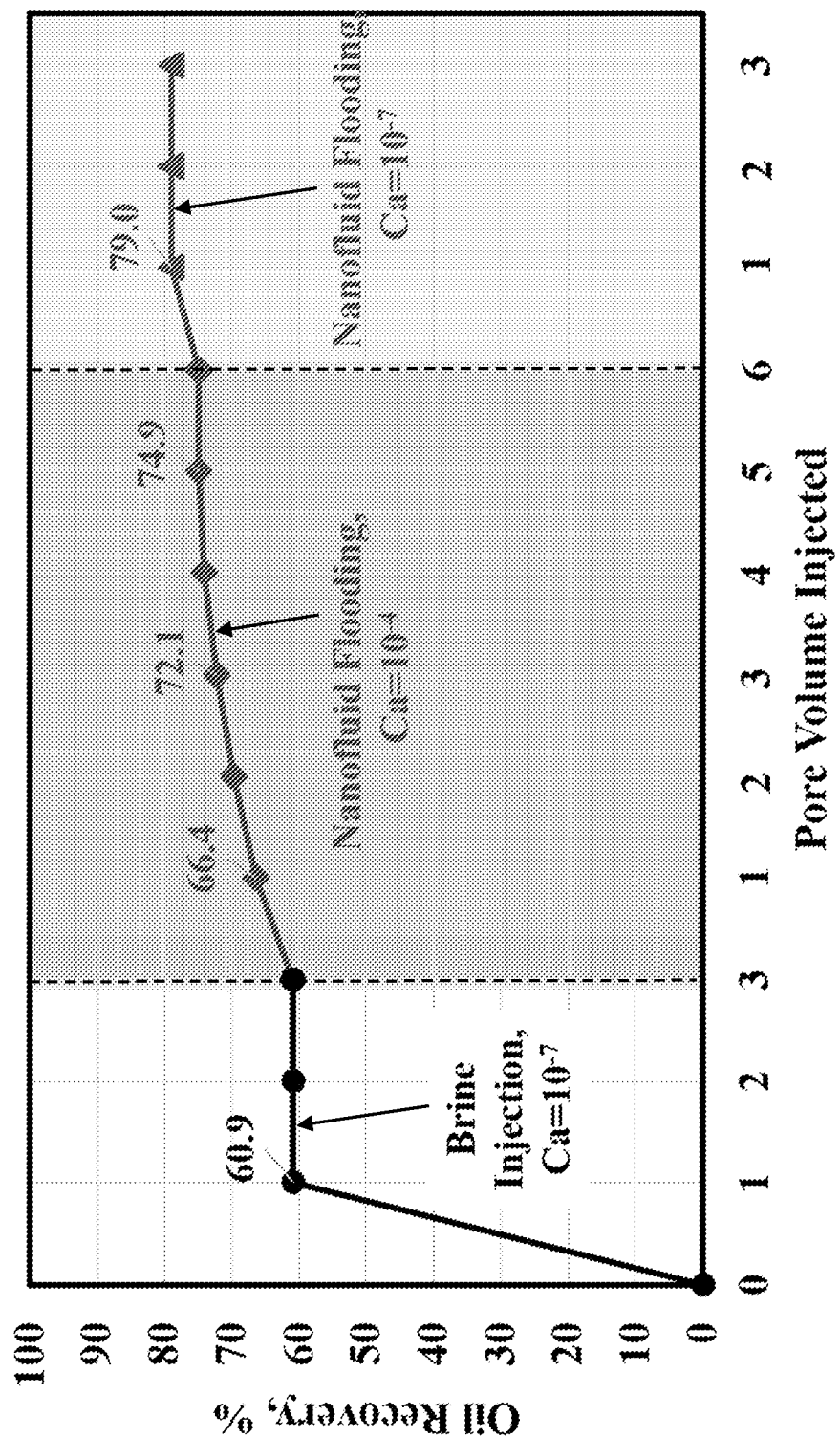
FIG. 11 shows two plots illustrating experimental results of oil recovery versus injected displacing fluid pore volume (PV) for secondary brine injection followed by tertiary nanofluid injection at different capillary numbers.

In order to verify that nanofluid can perform better when it is in contact with the solid substrate and the oil for a longer time, two additional sets of flooding experiments were conducted. In the first set of experiments, the bead pack was flooded with brine at Ca=$10^{-4}$ until oil was no longer produced at 3 PV. Subsequently the bead pack was flooded with nanofluid at Ca=$10^{-4}$ until oil was no longer produced at 6 PV followed by flooding the bead pack with nanofluid at Ca=$10^{-7}$ until oil was no longer produced at 3 PV. This first set of flooding experiments is shown in FIG. 11. With respect to pore volumes injected, FIG. 11 shows an additional 4.1% oil recovery by flooding the bead pack with nanofluid at Ca=$10^{-7}$ relative to the oil recovery by flooding the bead pack with nanofluid at Ca=$10^{-4}$. The time-scale of course is considerably larger than with the higher capillary number.

Figure 12:
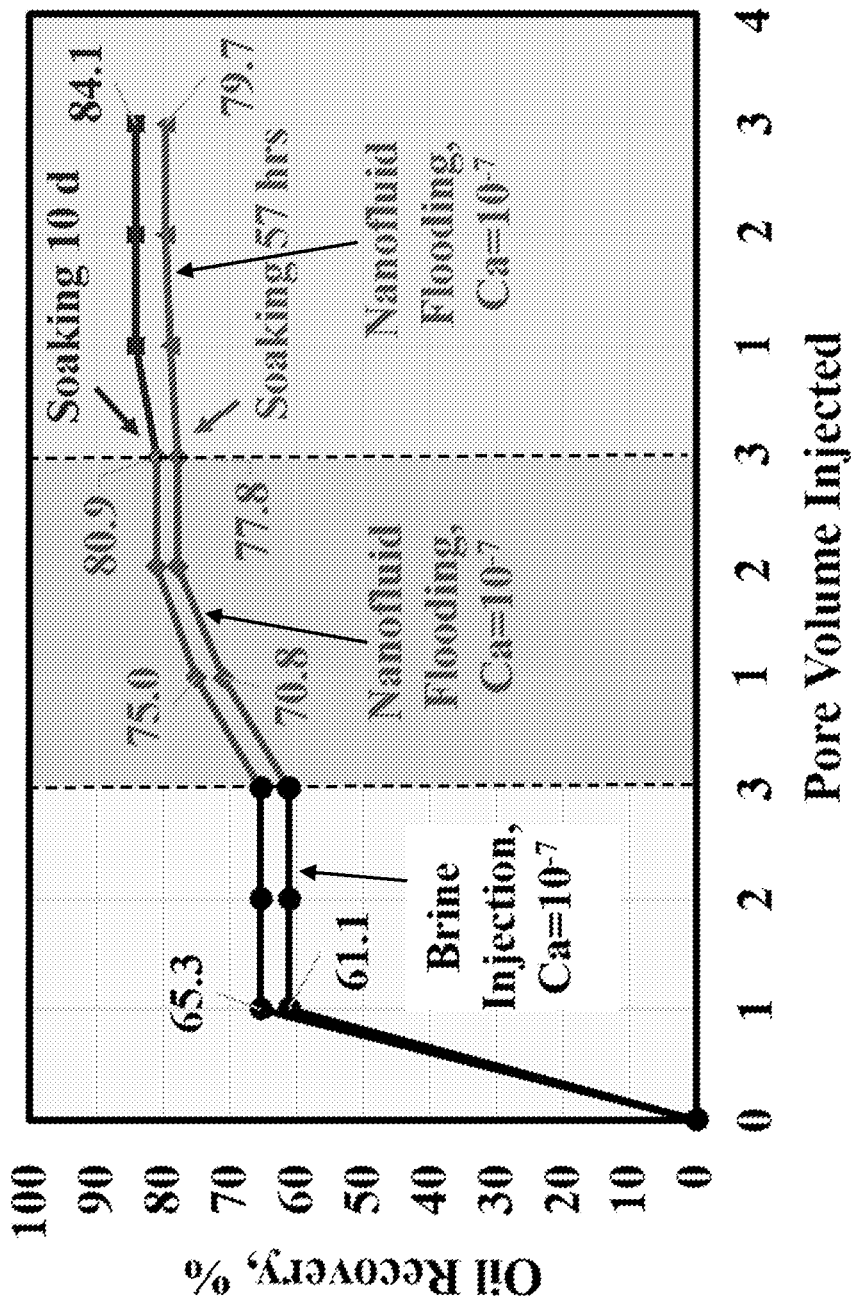
FIG. 12 shows two plots illustrating experimental results of oil recovery versus injected displacing fluid pore volume (PV) for secondary brine injection followed by tertiary nanofluid injection at a capillary number (Ca) of $10^{-7}$ with different soak times.

In the second set of experiments, the bead pack was flooded with brine at Ca=$10^{-4}$ until oil was no longer produced at 3 PV. Subsequently the bead pack was flooded with nanofluid at Ca=$10^{-7}$ until oil was no longer produced at 3 PV. The injection pump was then turned off (Ca=0) for a soak time (57 hours for one process and 10 days (240 hours) for another process). Following the soak time, the bead pack was flooded with nanofluid at Ca=$10^{-7}$ until oil was no longer produced at 3 PV. This second set of flooding experiments is shown in FIG. 12. FIG. 12 shows an additional 3.2% oil recovery for the 10 day soak time and an additional 1.9% oil recovery for the 57 hour soak time.

These two sets of experiments further verify the effect of the structural disjoining pressure mechanism on oil recovery. The longer in time that the nanofluid was in contact with the solid substrate and the oil improved the performance of the EOR. Given the time for structural disjoining pressure mechanism to operate, the nanofluid can perform better at low capillary number and as effectively as brine flooding at higher capillary numbers.

Figure 13:
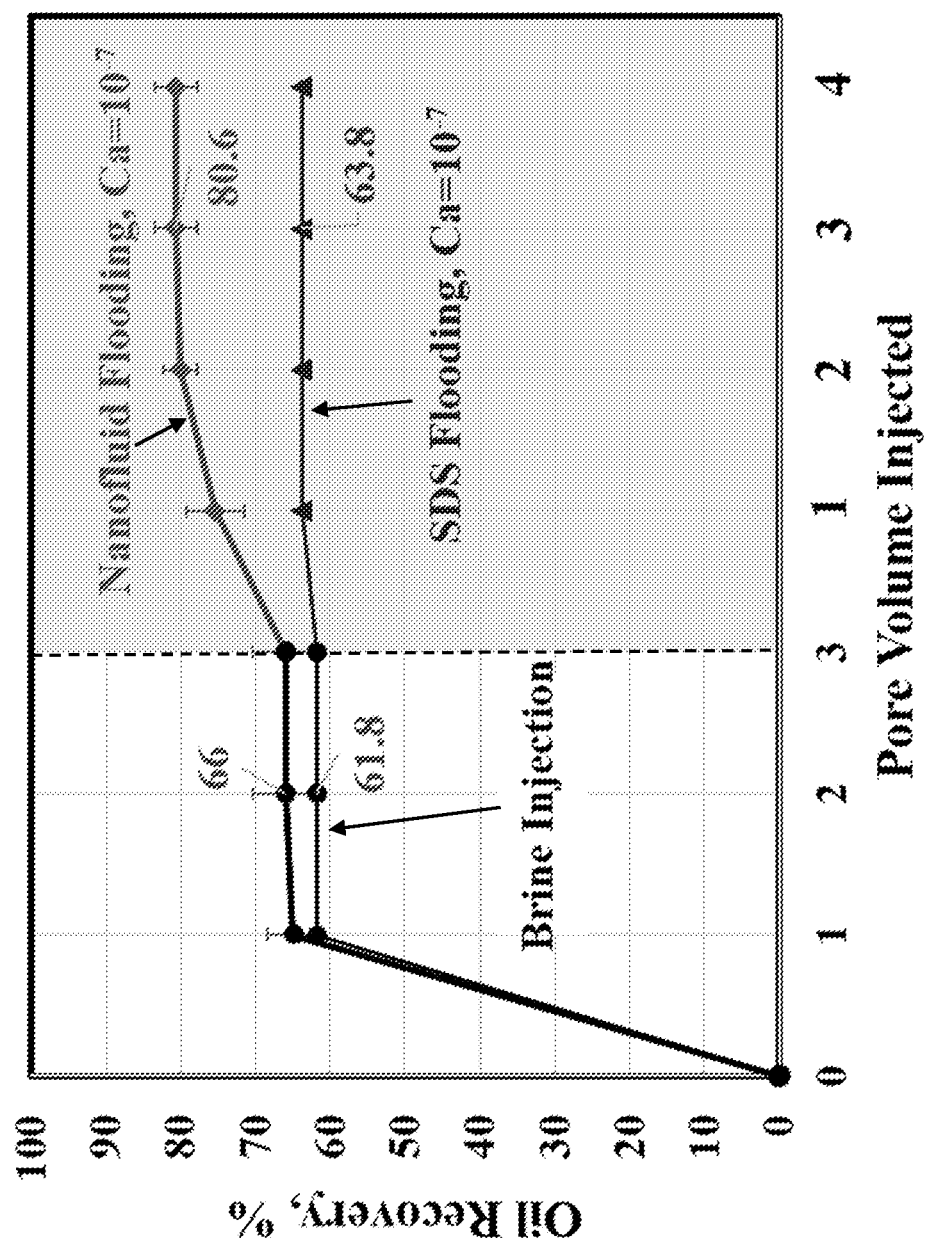
FIG. 13 shows two plots illustrating experimental results of oil recovery versus injected displacing fluid pore volume (PV) for secondary brine injection followed by tertiary nanofluid injection at a capillary number (Ca) of $10^{-7}$ or SDS solution injection at a capillary number (Ca) of $10^{-7}$.

To exclude interfacial tension induced oil recovery from the oil recovery due to nanofluid structural disjoining pressure, one additional experiment was conducted by flooding with a 1.35 mM SDS solution (the same IFT as the nanofluid) at Ca=$10^{-7}$ after brine injection at Ca=$10^{-7}$ and a temperature of 22±1° C. FIG. 13 shows that 14.6% of additional oil was recovered using nanofluid compared to 2% using SDS solution at Ca=$10^{-7}$. The additional oil of 2% by SDS solution is purely due to the interfacial tension reduction. Compared to oil recovery by SDS solution, the additional oil recovery by nanofluid is 12.6%, which is purely due to the structural disjoining pressure mechanism.

Figure 14B:
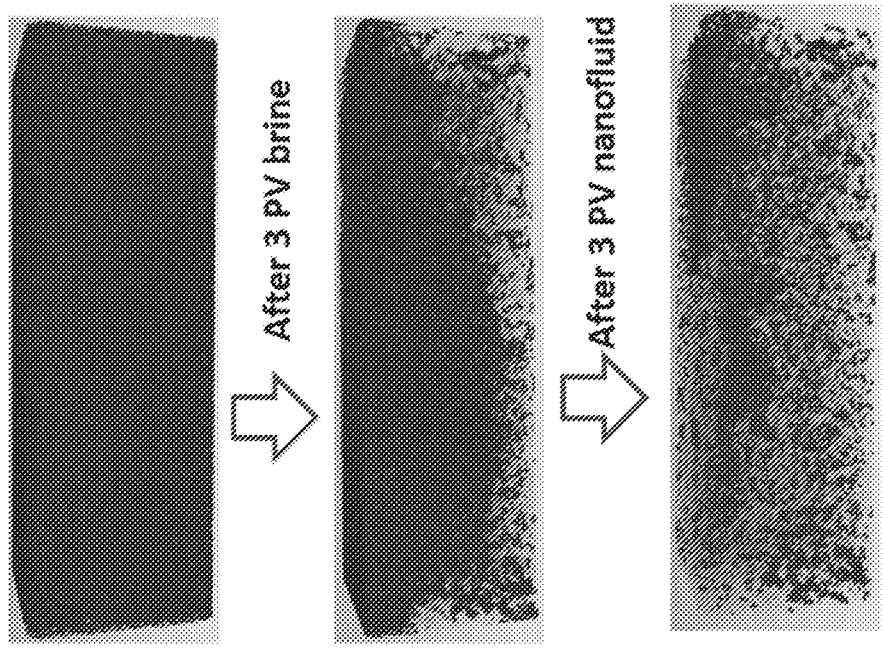
FIG. 14B are images derived from a 3D model measured by an X-ray micro-CT facility. Note that darker regions are oil and lighter regions are the aqueous phase in FIG. 14B.
Figure 14A:
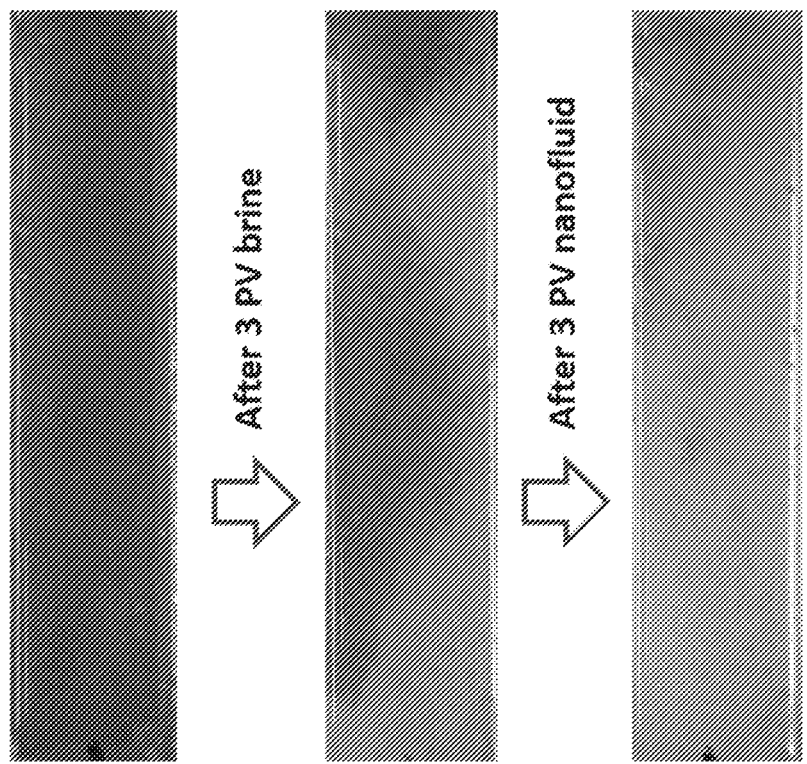
FIG. 14A are side view images of a bead pack during a flooding sequence.

FIG. 14A shows the side views of the bead pack (porous medium) acquired by the digital camera during a flooding sequence. Initially, the bead pack is predominantly filled with oil (after brine is displaced by the oil). The oil saturation was between 80-85%. After 3 PV of brine flooding at Ca=$10^{-7}$, the gravitational effect is quite noticeable and oil was mostly displaced from the bottom of the bead pack and is retained towards the top of the bead pack. Subsequently, the entrapped oil was displaced (although incompletely) by nanofluid injection at Ca=$10^{-7}$. FIG. 14B shows images taken from a 3D model derived from the X-ray micro-CT facility during the same flooding sequence. Note that darker regions are oil and lighter regions are the aqueous phase in FIG. 14B. In the images of FIG. 14B, it is easier to see that gravity played an important role during brine flooding, although at a Ca=$10^{-7}$ one would expect capillarity to dominate over gravity. Nanofluid caused an apparent reduction in the gravitational effect during flooding process and oil was more uniformly displaced along the porous medium.

The density of nanofluid is substantially the same as that of brine, but the interfacial tension with respect to oil is considerably smaller. Therefore, one would expect capillarity to dominate gravity for brine in comparison to nanofluid. The results are however quite contrary and it is useful to consider the Bond number. Since the only variable not considered thus far is the contact angle, we analyze its effect through Bond number Bo, which is given as:

$$Bo = \frac{\Delta \rho g R^2}{2\gamma \cos\theta_A}, \quad (3)$$

where $\Delta \rho$ is the density difference between brine and oil, g is the gravitational acceleration, R is the bead radius, $\gamma$ is the interfacial tension between the aqueous phase and the oil, and $\theta_A$ is the advancing contact angle.

The calculated Bo for brine is 0.119 compared to that of 0.022 for nanofluid. Clearly gravity may not be neglected during brine advance, but plays a negligible role during nanofluid injection. Even with an advancing contact angle of 88°, the capillary number is still sufficiently small for ensuring oil trapping. The receding contact angle for brine is 42±3°, indicative of water wetness.

FIG. 15A shows the side views of the bead pack acquired by the digital camera before and after 3 PV nanofluid flooding at Ca=$10^{-7}$. Note that darker regions are oil and lighter regions are the aqueous phase in FIGS. 15A and 15B. The bead pack presents trapped oil ganglia (or blobs). After the 3 PV nanofluid flooding, the oil blobs are in large clusters and predominantly on the upper part of the bead pack. The nanofluid flooding breaks the large structures into small disconnected oil blobs of a few bead lengths. FIG. 15B shows images taken from a 3D model derived from the X-ray micro-CT facility camera before and after the same 3 PV nanofluid flooding.

In the present disclosure, a series of EOR flooding experiments using nanofluid at different capillary numbers (Ca=$10^{-7}$, $10^{-5}$, $10^{-4}$) was performed and compared with brine. An additional oil recovery of around 15% may be achieved by the nanofluid injection at a Ca $10^{-7}$ as compared to brine injection at a Ca of $10^{-7}$. The additional oil recovery due to the nanofluid injection decreases as the capillary number of the nanofluid injection increases due to insufficient time for nanofluid film to advance through structural disjoining pressure and displace oil. Allowing the bead pack to be treated with nanofluid and then displacing oil confirms that this hypothesis is true. Improved oil recovery due to nanofluid is effective when $T_a \gg T_f$.

To separate the interfacial tension induced oil recovery from that due to wettability alteration by structural disjoining pressure, a flooding experiment with SDS solution (the same IFT as IIT nanofluid) was conducted at Ca=$10^{-7}$ after brine injection at Ca=$10^{-7}$. Compared to oil recovery by SDS solution, the additional oil by nanofluid is 12.6% and is purely due to the structural disjoining pressure.

High-resolution X-ray microtomography 3D models and views show that gravity plays a more pronounced role during brine injection compared to nanofluid injection and was initially unexpected. It appears that this was primarily driven by reduced capillarity during brine advance.

Nanofluids are as effective as or better than high capillary number brine flooding. Allowing nanofluid sufficient contact time appears to be the most effective for total oil recovered. Our findings can be applied to enhanced oil recovery by nanofluids.

Figure 16:
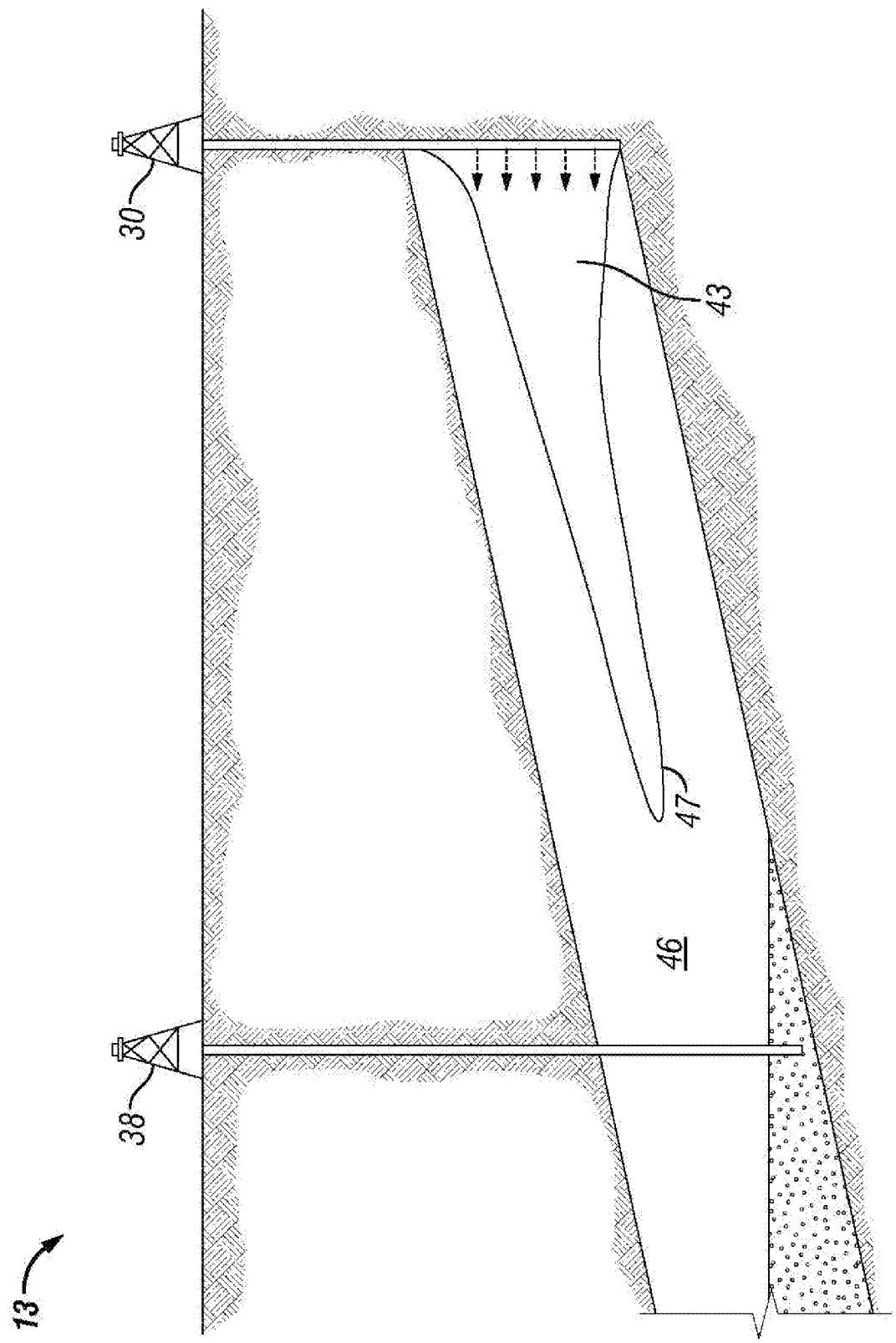
FIG. 16 is a schematic illustration of an enhanced oil recovery installation.

Enhanced oil recovery allows for higher recovery efficiency, which may not be achievable by traditional recovery mechanisms. An oilfield installation for EOR is seen in FIG. 16 showing an EOR installation 13 including an injection well 30 and a production well 38. During an EOR process, injection fluid 43 is injected through the injection well 30 into a subterranean reservoir 46 using an injection means (such as an injection pump) and establishes a fluid front 47 of EOR agent behind an oil bank that moves through a rock matrix within the reservoir 46. The injection fluid 43 increases pressure within the reservoir 46, mobilizes trapped and bypassed oil, and forces hydrocarbons toward the production well 38. The location of the EOR agent 47 may be monitored through sampling from a monitoring well (not shown).

In accordance with the present disclosure, the injection fluid 43 can be a nanofluid as described herein. The flow rate of the nanofluid injected through the injection well 30 during the EOR process can be controlled such that it matches a desired flow rate corresponding to a low capillary number. In one embodiment, the capillary number is less than $10^{-6}$ (e.g., Ca=$10^{-7}$). In another embodiment, the capillary number is less than $10^{-7}$. In one embodiment, the flow rate of the injected nanofluid can be controlled such that the advection time scale $T_a$ is greater than the nanofilm-formation timescale $T_f$ (e.g., $T_a > T_f$) during the EOR process. In one embodiment, the flow rate of the injected nanofluid can be controlled such that the advection time scale $T_a$ is greater than at least 10 times the nanofilm-formation time-scale $T_f$ (e.g., $T_a > 10\, T_f$) during the EOR process. In other words, the desired flow rate is selected such that the advection time scale $T_a$ is greater than (and possibly greater than 10 times the nanofilm-formation time-scale $T_f$) during the EOR process. The advection time scale $T_a$ is dependent on the flow rate of the injected nanofluid and is representative of the time period for a particle of the injected nanofluid to travel from the injection well through the reservoir to the production well. The advection time scale $T_a$ for a given injection rate can vary from reservoir to reservoir and can be dependent upon the permeability distribution of the rock matrix of the reservoir, the design of the injection and production wells and possibly other factors as well. The advection time scale $T_a$ for a desired flow rate of the EOR process can be derived by analysis or numerical simulation of the particular EOR installation. The nanofilm-formation time-scale $T_f$ during the EOR process is independent of the flow rate of the injected nanofluid and is representative of the time period for a thin film of the nanofluid to form and dislodge oil in the reservoir. The nanofilm-formation time-scale $T_f$ can vary from reservoir to reservoir and can be dependent upon the mineralogy of the rock matrix of the reservoir, the composition of the oil in the reservoir, the composition of the injected nanofluid and possibly other factors as well. The nanofilm-formation time-scale $T_f$ can be measured from laboratory studies. The flow rate of the injected nanofluid during the EOR process can be controlled by manual or automatic adjustment of an injection pump pressure, an injection pump flow rate, and/or an injection choke valve setting such that the flow rate of the injected nanofluid matches the desired flow rate.

The nanofluid injection can be part of a tertiary recovery mode operation (enhanced oil recovery) that follows a secondary recovery mode operation (such as a brine flood). The nanofluid injection can also be part of a secondary recovery mode operation (enhanced oil recovery) that follows a primary recovery mode operation.

There have been described and illustrated herein several embodiments of a method and system for enhanced oil recovery employing nanofluids. While particular embodiments have been described, it is not intended that the invention be limited thereto, as it is intended that the invention be as broad in scope as the art will allow and that the specification be read likewise. Thus, while particular oils, brine (aqueous) solutions and nanofluid compositions have been disclosed, it will be appreciated that other oils, brine (aqueous) solutions and nanofluid compositions can be used as well. In addition, while a particular configuration of an enhanced oil recovery installation has been disclosed, it will be understood that other configurations for enhanced oil recovery can be used. It will therefore be appreciated by those skilled in the art that yet other modifications could be made to the provided invention without deviating from its spirit and scope as claimed.

What is claimed is:

1. A method for recovery of oil from a subterranean reservoir comprising:
   injecting nanofluid through at least one well that traverses the subterranean reservoir and into the subterranean reservoir at a controlled flow rate;
   wherein the controlled flow rate corresponds to a capillary number of less than $10^{-6}$.

2. A method according to claim 1, further comprising:
   drilling or providing at least one injection well and at least one production well that traverse the subterranean reservoir, wherein the nanofluid is injected through the injection well and into the subterranean reservoir.

3. A method according to claim 2, wherein the controlled flow rate corresponds to an advection time scale $T_a$ that is greater than a nanofilm-formation time-scale $T_f$.

4. A method according to claim 2, wherein the controlled flow rate corresponds to an advection time scale $T_a$ that is greater than at least ten times a nanofilm-formation time-scale $T_f$.

5. A method according to claim 2, further comprising:
   determining the controlled flow rate such that the controlled flow rate corresponds to an advection time scale $T_a$ that is greater than a nanofilm-formation time-scale $T_f$.

6. A method according to claim 3, wherein the advection time scale $T_a$ is representative of the time period for a particle of the injected nanofluid to travel from the injection well through the subterranean reservoir to the production well.

7. A method according to claim 3, wherein the advection time scale $T_a$ for a given flow rate of injected nanofluid is dependent upon at least one of: the permeability distribution of the rock matrix of the reservoir, and the design of the injection and production wells.

8. A method according to claim 3, wherein the advection time scale $T_a$ for a given flow rate of injected nanofluid can be derived by analysis or numerical simulation of a particular enhanced oil recovery installation.

9. A method according to claim 3, wherein the nanofilm-formation time-scale $T_f$ is representative of the time period for a thin film of the nanofluid to form and dislodge oil in the subterranean reservoir.

10. A method according to claim 3, wherein the nanofilm-formation time-scale $T_f$ is dependent upon at least one of: the mineralogy of the rock matrix of the reservoir, the composition of the oil in the reservoir, and the composition of the injected nanofluid.

11. A method according to claim 1, wherein the flow rate of the injected nanofluid is controlled by manual or automatic adjustment of at least one of an injection pump pressure, an injection pump flow rate, and an injection choke valve setting.

12. A method according to claim 1, wherein the nanofluid injection is part of a tertiary recovery mode operation that follows a secondary recovery mode operation.

13. A method according to claim 1, wherein the nanofluid injection is part of a secondary recovery mode operation that follows a primary recovery mode operation.

14. A system for recovery of oil from a subterranean reservoir comprising:
   at least one well that traverses the subterranean reservoir; and
   injection means for injecting nanofluid through the well and into the subterranean reservoir at a controlled flow rate;
   wherein the controlled flow rate corresponds to a capillary number of less than $10^{-6}$.

15. A system according to claim 14, further comprising:
   at least one injection well and at least one production well that traverse the subterranean reservoir wherein the injection means is configured to inject nanofluid through the injection well and into the subterranean reservoir at the controlled flow rate.

16. A system according to claim 15, wherein the controlled flow rate corresponds to an advection time scale $T_a$ that is greater than a nanofilm-formation time-scale $T_f$.

17. A system according to claim 15, wherein the controlled flow rate corresponds to an advection time scale $T_a$ that is greater than at least ten times a nanofilm-formation time-scale $T_f$.

18. A system according to claim 15, wherein the injection means is configured to control the flow rate such that the controlled flow rate corresponds to an advection time scale $T_a$ that is greater than a nanofilm-formation time-scale $T_f$.

* * * * *